United States Patent
Ohmura

[11] Patent Number: 6,138,149
[45] Date of Patent: Oct. 24, 2000

[54] SYSTEM FOR TRACKING INFORMATION COPIED FROM A WEB PAGE AND SENT VIA ELECTRONIC MAIL

[75] Inventor: Kazunori Ohmura, Kanagawa, Japan

[73] Assignee: Sony Corporation, Tokyo, Japan

[21] Appl. No.: 09/088,826

[22] Filed: Jun. 2, 1998

[30] Foreign Application Priority Data

| Jun. 5, 1997 | [JP] | Japan | 9-146982 |
| Jun. 6, 1997 | [JP] | Japan | 9-148367 |
| May 8, 1998 | [JP] | Japan | 10-125634 |

[51] Int. Cl.[7] ............... G06F 13/38; G06F 15/17
[52] U.S. Cl. ............ 709/218; 709/200; 709/206; 709/250; 709/219; 707/10; 705/26; 395/600
[58] Field of Search .................. 395/600, 200; 707/10, 513; 705/26; 709/206

[56] References Cited

U.S. PATENT DOCUMENTS

| 5,530,852 | 6/1996 | Meske, Jr. et al. | 395/600 |
| 5,771,355 | 6/1998 | Kuzma | 395/200 |
| 5,774,670 | 6/1998 | Montulli | 395/200 |
| 5,781,901 | 7/1998 | Kuzma | 707/10 |
| 5,790,793 | 8/1998 | Higley | 395/200 |
| 5,815,663 | 9/1998 | Uomini | 395/200 |
| 5,892,908 | 4/1999 | Hughes et al. | 395/200 |
| 5,903,723 | 5/1999 | Beck et al. | 395/200 |
| 5,953,732 | 9/1999 | Meske, Jr. et al. | 707/513 |
| 5,963,915 | 10/1999 | Kirsch | 705/26 |
| 5,974,449 | 10/1999 | Chang et al. | 709/206 |

OTHER PUBLICATIONS

Mark Brown Using Netscape 2, Nov. 3, 1999.

*Primary Examiner*—Zarni Maung
*Assistant Examiner*—Farzaneh Farahi
*Attorney, Agent, or Firm*—Limbach & Limbach, LLP

[57] ABSTRACT

The electronic mail editing section 26 has a function of editing an electronic mail and inserts a stored index sticker into the text of the electronic mail. The edited electronic mail after insertion of the index sticker is sent to the electronic mail transmitting section 27 by an electronic mail transmitting command, and then transmitted to other information processing apparatus 10b serving as a client computer. The transfer information notifying section 28 sends out transfer information via the internet 7 to the WWW server 8i upon sending the electronic mail by the electronic mail transmitting section 27. The transfer information comprises prescribed information permitting confirmation by the WWW server 8i of the transfer of the information. As a result, the WWW server 8i can know at least that the information processing apparatus 10a has transferred the information to the other information processing apparatus 10b.

15 Claims, 20 Drawing Sheets

SYSTEM FOR TRACKING INFORMATION COPIED FROM A WEB PAGE AND SENT VIA ELECTRONIC MAIL

BACKGROUND OF THE INVENTION

1. Field of the Invention

The present invention relates to an information processing apparatus and a method therefor, an information providing apparatus and a method therefor, an information processing system and a providing medium. More particularly, the invention relates to an information processing apparatus and a method therefor, an information providing apparatus and a method therefor, an information processing system and a providing medium, which are simple and efficient, for extracting part of information from an information providing apparatus such as a WWW server connected by a communication network and transferring the same to other information processing apparatuses via an electronic mail.

2. Description of the Related Art

Along with the present expansion and enrichment of communication networks via internet and the like, it is now possible to carry out information communications such as retrieval and readout of information provided by an information providing apparatus such as a server by the use of an information processing apparatus such as a personal computer or a portable information terminal device (hereinafter referred to as PDA (Personal Digital Assistants)), or exchange of electronic mails with other information processing apparatus.

Information may be retrieved either by a conventional technique known as net surfing or by keyboard retrieval.

Net surfing is defined as a method of retrieval of necessary information saved in a WWW server while transferring from a WWW (World Wide Web) server to another WWW server connected on internet until necessary information is reached. A WWW server saves a text file (referred to as an "HTML file") described in a text-format language known as a hypertext such as the hypertext markup language (HTML). The hypertext is a language that can be correlated with images or voice by means of pointers or links. An HTML file contains as required a description of a URL (Uniform Resource Locator) showing address information showing a location of pertinent information (known as a pointer) or a counter-part of linkage for linking with other HTML files.

The information processing apparatus having read the HTML file interprets the HTML file and displays the resultant information on the screen, and simultaneously, can further read out information present at an address derived from the pointer thereof, displays image and the like on the screen, or provide an output of voice from a speaker, or read out the HTML file of the counter-part in linkage shown by URL. When there is a linkage of further another HTML file in the HTML file in linkage, the information processing apparatus can further read out the other HTML file. The information such as the read-out image or the HTML files may be present in a WWW server other than the WWW server saving the HTML file read out first. Therefore, the information in each WWW server would have a structure comprising a cobweb-shaped chain, known as a dispersed structure. Because it is thus possible to continue retrieval of numerous other files starting from a single piece of information (a single file) along the WWW server, the user can reach the target information via so-called net surfing.

Keyword retrieval has an object to obtain target information, by the use of one or more keywords, by retrieving information corresponding to the keywords. In general, index information for retrieval of information by the use of keywords is saved in a single WWW server. In order to obtain target information, the user first specifies appropriate words serving as a key. The subsequent steps comprise accessing the WWW server saving the index information, starting the application for retrieval, and entering the specified keyword. The application for retrieval retrieves the information corresponding to the entered keyword and notifies the user of an overview and the location of that information. The user can obtain the target information by watching the overview, or accessing the WWW server or the like actually containing the information.

The foregoing information communication by a WWW server, either by net surfing or by keyword retrieval, is basically that a single information source provides information from a single WWW server to innumerable users by radially dispersing the same. The information provider only waits for user's retrieval of the information, and does not positively conduct information communication to the public.

An electronic mail system has, on the other hand, an important role as means of communication of information between individuals, and as compared with provision of information by means of a WWW server, has a feature that information is positively communicated. Therefore, when the information provided by the WWW server is efficiently transferred via an electronic mail, the value of providing information would become higher for the information provider of the WWW server.

In the conventional art, when information provided by a WWW server, such as a home page, is to be communicated to others, the mail sender transmits that electronic mail by inserting an overview of that information and URL showing the address where the information is present in the form of character information into the text of an electronic mail. The receiver of the electronic mail determines, from the overview contained in the character information, whether or not the information is necessary, and if necessary, can obtain the whole figure of that information by accessing the information provider of the WWW server on the basis of the inserted URL information.

In the application software for electronic mail now popularly in use, an HTML file may also be transmitted as an attachment to the mail. Information has therefore been communicated to others by transmitting, as an attachment to an electronic mail, a home page introducing information prepared in the HTML file and provided by the WWW server.

For an information provider providing self-information to a communication network by the use of an information providing apparatus, by how many people the information is read out is an important concern. In the conventional art, an information processing apparatus accesses directly the information providing apparatus, and when the information in a home page or the like provided by the information providing apparatus was read out, the number of accesses was counted and the number of readout runs was confirmed.

By the two foregoing methods for obtaining WWW server information provided onto a network through user's retrieval, namely net surfing or keyword retrieval, it is not easy to obtain target information from among a huge amount of information at present.

With an increase of information, information saved by a single WWW server is densely entangled with many pieces of information into a cobweb shape. In order to reach the final target information from the information that the user has first obtained, it is inevitable to perform net surfing to many chained pieces of information which is not a target, thus making it difficult to retrieve the information.

In keyword retrieval, it is not practically easy to accurately express necessary information into a keyword. Even when the user specifies a keyword, the keyword must be common with the keyword valid in index information, and necessary information cannot be retrieved unless the both keywords are in agreement. Since the number of pieces of information available from keyword retrieval increases according as there are more pieces of information, it is necessary to find out target information from among the retrieved pieces of information. Even in keyword retrieval, therefore, it is difficult, or if possible, requires much time and labor, to obtain the target information from a number of pieces of information.

A conventional problem has therefore been that useful and valuable information, if provided by an information provider, has been buried in innumerable pieces of information, sometimes preventing effective utilization of information. This is a disadvantage for information providers as well as for the society.

Also in an electronic mail system capable of positively communicating information, it is troublesome for a user to enter a URL into the text of an electronic mail. Attachment of a home page itself is redundant, and it is not efficient for a mail receiver to read through the whole text of the home page.

When the information was once copied into the information processing apparatus, it has conventionally been impossible for the information provider to know the subsequent status of transfer of the copied information. More specifically, along with the recent progress of communication network, when the copied information leaves the information providing apparatus, passes from an information processing apparatus to another and transferred in the form of an electronic mail to a plurality of users, it is impossible by the conventional art to follow up the history of transfer. The information provider cannot therefore know even the number of transfers in spite of the transfer of the information provided by the provider to other users. It has therefore been difficult to determine whether or not that information has actually an informational value and whether or not that information is attracting the general attention.

The present invention was developed in view of these circumstances, and has an object to provide an information processing apparatus and a method therefor, and a providing medium of a software program, which can simply and efficiently process information provided by an information providing apparatus or the like while utilizing positive communicability of information by an electronic mail.

Another object of the invention is to provide an information processing apparatus and an information processing method, in which information provided by an information providing apparatus is transferred to users; the contents of transfer are notified to the information provider; and further, not only the number of transfers but also the sender of the transfer and even the receivers can be determined.

A further object of the invention is to provide an information processing apparatus and a method therefor, and a providing medium of a software program, making it possible to extract part of the information and to transmit the thus extracted part as an electronic mail, and in addition, to provide an information providing apparatus and a method therefor permitting grasp of the status of transfer from such contents of transfer.

SUMMARY OF THE INVENTION

The information processing apparatus according to an aspect of the invention comprises browser means which reads out information held by an information providing apparatus connected to a communication network and extracts a partial area of the read-out information; electronic mail editing means which inserts the partial area of the extracted information into the text of an electronic mail and automatically adds address information of a provider of the information in response to the insertion; and electronic mail transmitting means which transmits the electronic mail containing the partial area of the extracted information and the address information to other information processing apparatuses via the communication network.

The information processing apparatus according to another aspect comprises browser means capable of reading out information provided by an information providing apparatus via the communication network; display means capable of displaying the read-out information; instructing means capable of instructing the displayed information; electronic mail editing means capable of editing an electronic mail; and electronic mail transmitting means capable of transmitting the edited electronic mail; the browser means having an index extracting section for extracting a partial area of information selected by means of a pointing device in the form of image data; and an index buffer section for storing index information comprising the image data and address information of the provider of the information; the electronic mail editing means having a mail text editing buffer section for storing the index information from the index buffer section, together with the electronic mail; and the electronic mail transmitting means transmitting the electronic mail stored in the mail text editing buffer section and the index information via the communication network to other information processing apparatuses.

In the information processing apparatus according to a further aspect, when an electronic mail received via the communication network contains a partial area of information provided by an information providing apparatus and address information of the provider of the information, the provider is automatically accessed on the basis of the address information through a prescribed instructing operation.

In the information processing apparatus according to a further aspect, when an electronic mail received via the communication network contains a partial area of information provided by an information providing apparatus and address information of the provider of the information, the address information is added to the electronic mail to enable transmission thereof onto the communication network.

The information processing apparatus according to a further aspect comprises electronic mail receiving means for receiving an electronic mail distributed from other information processing apparatus; electronic mail editing means capable of editing an electronic mail, which, when a received electronic mail contains index information consisting of image data and address information of the information provider of the image data, image-displays the image data in the text of the electronic mail displayed by the display means, and transmits the address information to the browser means by a prescribed instructing operation; display means capable of displaying the electronic mail; and browser means which is started by the prescribed instructing operation, and reads out information held by an information providing apparatus connected to the communication network, so that the provider is automatically accessed on the basis of the address information.

The information processing apparatus according to a further aspect comprises electronic mail editing means which can insert a partial area of extracted information into the text of an electronic mail and automatically add address information of a provider of the information in response to the insertion; browser means which reads out information held by the information providing apparatus connected to the communication network and extracts a partial area of the read-out information, so that, when an electronic mail received via the communication network contains a partial area of information provided by the information providing apparatus and address information of the provider of the information, the provider is automatically accessed on the basis of the address information through a prescribed instructing operation; and electronic mail transmitting means for transmitting the electronic mail containing a partial area of the extracted information and the address information to other information processing apparatuses via the communication network.

The information providing apparatus according to an aspect of the invention comprises database means for storing information including index information comprising image data and address information of the information provider of the image data; and data transmitting means for transmitting the information including the index information in response to a read command from an information processing apparatus.

The information providing apparatus according to another aspect comprises index information preparing means for preparing index information comprising image data and address information of the information provider of the image data; data preparing means for preparing information including the index information; database means for storing the information; and data transmitting means for transmitting the information including the index information in response to a read command from the information processing apparatus.

The method of processing information according to an aspect of the invention comprises a step of reading out information provided via a communication network; a step of extracting a partial area of the information and inserting the same into the text of an electronic mail; a step of automatically adding address information of the provider of the information to the electronic mail in response to the insertion; and a step of transmitting the electronic mail including the partial area of the extracted information and the address information onto the communication network.

The method of processing information according to another aspect comprises a step of displaying information received via a communication network after interpretation; a step of selecting a partial area from among displayed information by the use of a pointing device; a step of extracting the selected partial area as image data; a step of storing the image data and address information of the provider of the information; a step of inserting the stored image data and address information into the text of an electronic mail; and a step of transmitting the inserted image data and address information, together with the electronic mail, onto the communication network.

The method of processing information according to a further aspect comprises a step of determining whether or not index information consisting of the information provided by an information providing apparatus and address information of the provider of the information is contained in a received electronic mail; and a step of automatically accessing the provider on the basis of the address information by a prescribed instructing operation.

The method of processing information according to a further aspect comprises a step of determining whether or not index information consisting of image data and address information of an information providing apparatus providing information of the image data is contained in a received electronic mail; a step of inserting the index information into the text of the electronic mail to be transmitted; and a step of transmitting the electronic mail containing the index information inserted therein.

The method of providing information according to an aspect of the invention comprises a step of adding to partial data contained in information provided by an information providing apparatus address information of the provider of the partial data; and a step of transmitting the address information, together with the partial data upon reading out the information to the information providing apparatus via a communication network.

The providing medium, according to an aspect of the invention, has a program readable by a computer recorded therein, which causes an information processing apparatus transmitting an electronic mail to execute a processing comprising a step of reading out information provided via a communication network; a step of extracting a partial area of the information and inserting the same into the text of an electronic mail; a step of automatically adding address information of the provider of the information in response to the insertion; and a step of transmitting an electronic mail containing the partial area of the extracted information and the address information.

The providing medium, according to another aspect, has a program readable by a computer recorded therein, which causes an information processing apparatus transmitting an electronic mail to execute a processing comprising a step of displaying information received via a communication network after interpretation; a step of selecting a partial area of the displayed information by the use of a pointing device; a step of extracting the selected partial area as image data; a step of storing the image data and address information of the provider of the information in prescribed storing means of the information processing apparatus; a step of inserting the stored image data and address information from the prescribed storing means into the electronic mail; and a step of transmitting the inserted image data and address information, together with the electronic mail, onto the communication network.

The providing medium, according to a further aspect, has a program readable by a computer recorded therein, which causes an information processing apparatus accessing an information providing apparatus to execute a processing comprising: a step of determining whether or not a received electronic mail contains index information consisting of information provided by the information providing apparatus or address information of the provider of the information; and a step of automatically accessing the provider on the basis of the address information by a prescribed instructing operation.

The providing medium, according to a further aspect, has a program readable by a computer recorded therein, which causes an information processing apparatus transmitting an electronic mail to execute a processing comprising a step of determining whether or not a received electronic mail contains index information consisting of image data and address information of an information providing apparatus providing information of the image data; a step of inserting the index information into the text of the electronic mail; and a step of transmitting the electronic mail to which the index information has been provided.

The providing medium, according to a further aspect, has a program readable by a computer recorded therein, which causes an information providing apparatus providing an information network with information to execute a processing comprising a step of adding address information of the provider of partial data to partial data contained in the provided information; and a step of transmitting the address information, together with the partial data upon reading out the information to the information providing apparatus via a communication network.

The information processing apparatus according to a further aspect comprises electronic mail editing means which adds information held by an information providing apparatus connected to the communication network and address information of the provider of the information to an electronic mail; electronic mail transmitting means which transmits the electronic mail added with the information and the address information of the provider of the information to other information processing apparatuses connected via the communication network; and distribution information notifying means which transmits transfer information showing transfer of the information to the provider of the information in response to transmission of the electronic mail.

The information providing apparatus according to a further aspect comprises distribution information receiving means which receives from an information processing apparatus via a communication network transfer information showing that information provided by the information providing apparatus and address information of the provider of the information have been added to an electronic mail and transferred to other information processing apparatuses; and distribution information storing means for storing distribution information showing the status of transfer for each piece of information on the basis of the received transfer information.

In the information processing system according to an aspect of the invention, the information processing apparatus comprises electronic mail editing means which adds information held by an information providing apparatus connected to a communication network and address information of the provider of the information to an electronic mail; electronic mail transmitting means which transmits the electronic mail added with the information and address information of the provider of the information to other information processing apparatuses connected via the communication network; and distribution information notifying means which transmits transfer information showing that the information has been transferred to the provider of the information in response to transmission of the electronic mail; and the information providing apparatus comprises distribution information receiving means which receives a transfer information showing that the information has been transferred via the communication network; and distribution information storing means which stores distribution information showing the status of transfer for each piece of information on the basis of the received transfer information.

The method of processing information according to a further aspect comprises a step of adding information held by an information providing apparatus connected to a communication network and address information of the provider of the information to an electronic mail; a step of transmitting the electronic mail added with the information and address information of the provider of the information to other information processing apparatuses connected via the communication network; and a step of transmitting transfer information showing that the information has been transferred to the provider of the information in response to transmission of the electronic mail.

The method of processing information according to a further aspect comprises a step of receiving transfer information showing that an electronic mail added with information provided by an information providing apparatus and address information of the provider of the information has been transferred to other information processing apparatuses; and a step of storing distribution information showing the status of transfer for each piece of information on the basis of the received transfer information.

The method of processing information according to a further aspect comprises a step of adding information held by an information providing apparatus connected to a communication network and address information of the provider of the information to an electronic mail; a step of transmitting the electronic mail added with the information and address information of the provider of the information to other information processing apparatuses connected via the communication network; a step of transmitting transfer information showing that the information has been transferred to the provider of the information in response to transmission of the electronic mail; a step of receiving the transfer information; and a step of storing distribution information showing the status of transfer for each piece of information on the basis of the received transfer information.

The providing medium according to a further aspect has a program readable by a computer recorded therein, which causes an information processing apparatus transmitting an electronic mail to execute a processing comprising a step of adding information held by an information providing apparatus connected to a communication network and address information of the provider of the information to an electronic mail; a step of transmitting the electronic mail added with the information and address information of the provider of the information to other information processing apparatuses connected via the communication network; and a step of transmitting transfer information showing that the information has been transferred to the provider of the information in response to transmission of the electronic mail.

The providing medium according to a further aspect has a program readable by a computer recorded therein, which causes an information providing apparatus providing information to an information network to execute a processing comprising a step of receiving transfer information showing that information provided by the information providing apparatus and address information of the provider of the information have been added to an electronic mail and transferred to other information processing apparatuses; and a step of storing distribution information showing the status of transfer for each piece of information on the basis of the received transfer information.

DESCRIPTION OF THE PREFERRED EMBODIMENTS

Figure 1:
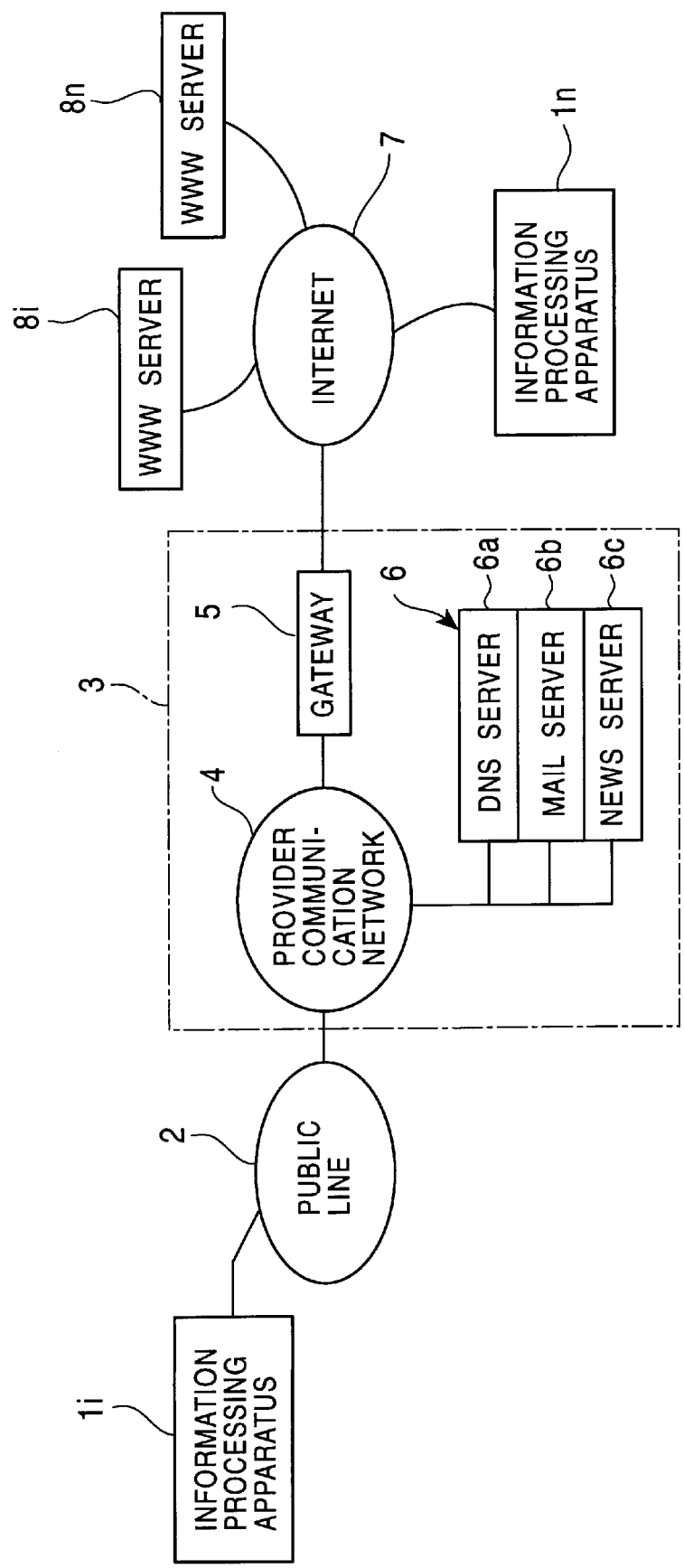
FIG. 1 is a schematic view illustrating a typical communication network configuration permitting information exchange between information processing apparatus or between an information processing apparatus and a WWW server.

First, the process of electronically acquiring information of an information processing apparatus or a of transmitting information to another information processing apparatus will be described. FIG. 1 schematically illustrates a typical communication network configuration between information processing apparatus or between an information providing apparatuses such as a WWW (World Wide Web) server and an information processing apparatus. Connection thereof and information exchange will be described with reference to FIG. 1. An information processing apparatus 1i is connected to an internet service provider (hereinafter referred to as a "provider") 3 with whom the user subscribes via a public line 2. A provider communication network 4 is arranged for the provider 3, to which a server 6 and a gateway 5 are connected. The server 6 is an information providing apparatus such as a DNS (Domain Name System) server 6a, a mail server 6b or a news server 6c.

When trying to obtain information from a particular WWW server 8i on an internet 7 which is a communication network exchanging information on the basis of TCP/IP (Transmission Control Protocol/Internet Protocol) by using an information processing apparatus 1i communication-connected to the provider 3, a user usually uses an information retrieving of the WWW server 8i known as a WWW browser and it suffices to directly enter an URL (Uniform Resource Locator). The URL shows the address of the WWW server 8i, and generally takes the form of "http://host name. Domain name/File name". The file name represents a file containing desired information and the host name and the domain name indicate the WWW server 8i which the file is saved. The domain name represents a group to which the WWW server 8i belongs, and the host name is the name of the WWW server 8i used in the group bearing that domain name; http is a command instructing transfer of a specified file name from the WWW server 8i to the information processing apparatus 1i under HTTP (Hypertext Transfer Protocol).

Upon input of URL, the DNS server 6a, one of the servers 6, finds an actual address (known as the IP address) of the WWW server 8i belonging to the domain name thereof, and the provider 3 carries out connection of the target WWW server 8i via the gateway 5 by means of the IP address. This establishes connection between the information processing apparatus 1i and the WWW server 8i. The WWW browser can cause transfer to the information processing apparatus 1i in accordance with an HTTP present in the WWW server 8i, and display the file on the information processing apparatus 1i.

The foregoing acquisition of information via direct input of the URL is on the assumption that the address of the WWW server 8i providing the information and the file name are known. When the location of the necessary information is not known, therefore, it suffices to retrieve the information by net surfing or key retrieval.

Now, transmission of an electronic mail from an information processing apparatus in to another 1i will be described. In FIG. 1, connection between the information processing apparatus In and the internet 7 is omitted. The user starts the electronic mail application software of the information processing apparatus 1n, thus permitting preparation of an electronic mail through the electronic mail editing section thereof. When transmitting the thus prepared electronic mail to the destination information processing apparatus 1i, it suffices to transmit it by specifying the destination by the URL. The URL in this case is generally described by a combination of the user name and the domain name of the information processing apparatus 1i with "@". The domain name is that of the mail server 6b, one of the servers 6 of the provider 3 in FIG. 1. Therefore, the electronic mail transmitted from the information processing apparatus 1n is saved in the mail server 6b.

As in the foregoing case, the information processing apparatus 1i connected to the provider 3 through a public line 2 starts the electronic mail application software therein, and can thus see the electronic mail addressed thereto held within the mail server 6b by means of the electronic mail receiving section.

Figure 2:
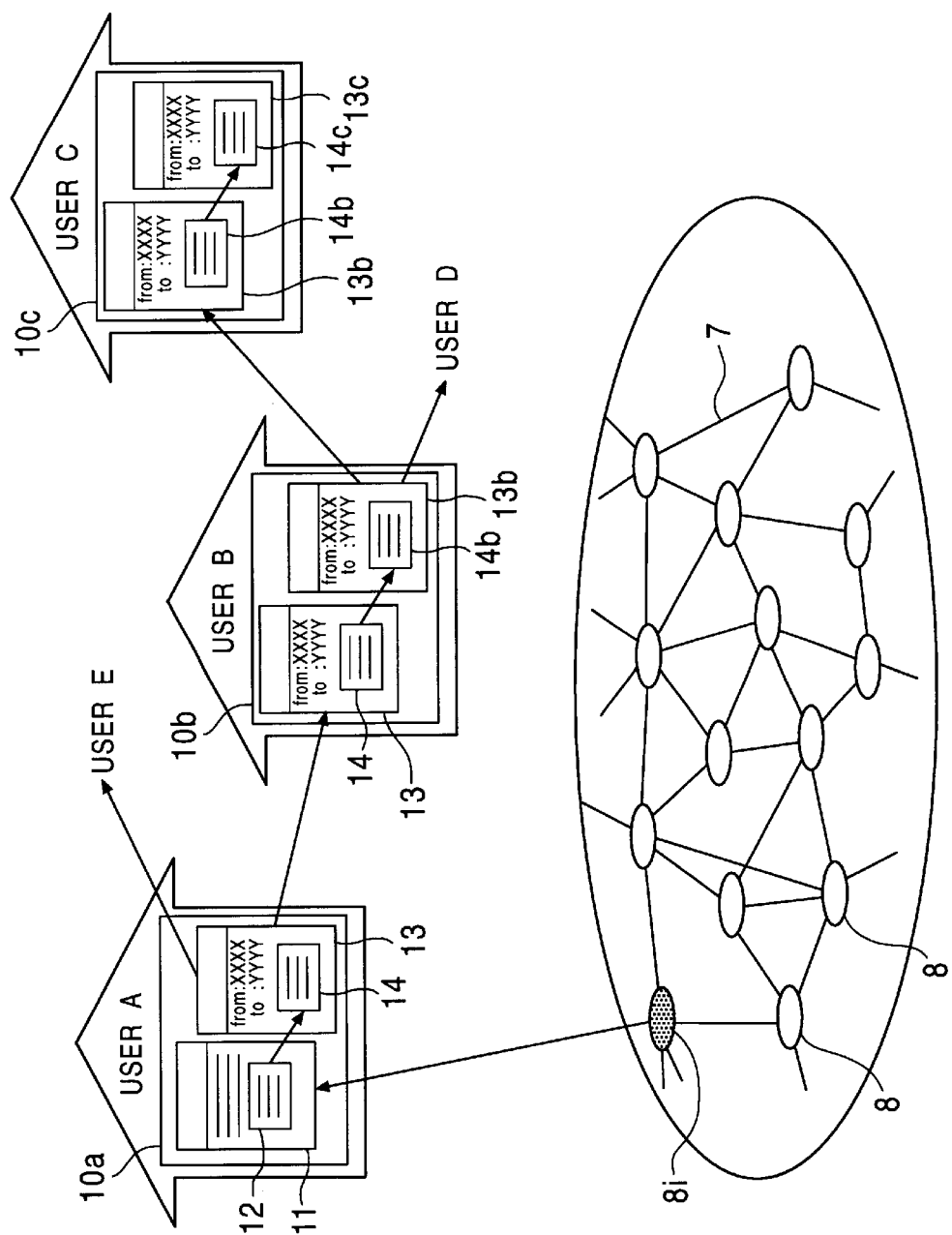
FIG. 2 is schematic view illustrating part of information of a WWW server, attached to an electronic mail and distributed on a network according to the invention.

FIG. 2 is a schematic view illustrating a case where necessary information is attached to an electronic mail and transferred on the network according to the invention. More specifically, FIG. 2 conceptually illustrates the process in which part of the received information is transferred by an electronic mail from the user A having received the information from a particular WWW server 8i from among innumerable WWW servers and the like connected in a cobweb shape via the internet 7 in the information processing apparatus (this space is hereinafter referred to as the "WWW informational spaces") to other users B, C, D, E . . . .

The user A can cause the information processing apparatus 10a in his possession to access a home page 11 provided by the WWW server 8i, one of the WWW informational spaces, and display the same on the display section of the information processing apparatus 10a. The user A can select and extract a particular extraction area 12 from the displayed home page 11. This extraction area 12 is the information which the user A wishes to communicate to the user B, i.e., for example, the area containing main contents and overview among the pieces of information described in the home page 11. Further, the user A can paste this extraction area 12 like a sticker in the mail text of the electronic mail 13 (this electronic sticker is hereinafter referred to as an "index sticker" 14 or "index information"). The pasted index sticker has the same screen contents as those displayed in the extraction area 12 of the displayed home page, and is displayed on the electronic mail 13.

The user A can transmit the thus edited and prepared electronic mail 13 to the user B. At this point, the information processing apparatus 10a sends out transfer information including the electronic mail address of the user A and information showing transfer to other information apparatus to the information providing apparatus 8i via the internet 7. The WWW server 8i having received the transfer information of the information processing apparatus 10a stores distribution information prepared on the basis of the transfer information in storing means of its own. As a result, the information provider by the WWW server 8i can thus know that the information provided by the information provider has been transferred to others.

The user B having received the electronic mail 13 can display the electronic mail 13 on the server by means of the information processing apparatus 10b in his possession. At this point, the pasted index sticker 14 is displayed on the screen with the same contents as those edited by the user A.

When the user B clicks the area of the index sticker 14, the information processing apparatus 10b requests the WWW server 8i to transfer the contents of the home page of the WWW server 8i, and can receive the transferred home page. Further, it is also possible to transfer the index sticker 14 displayed in the electronic mail 13 to other users C and D. In this case, the index sticker 14 of the electronic mail 13 received by the user B is copied, and pasted into the text of the electronic mail 13b to be transmitted next. The pasted index sticker 14b is displayed in the same manner as the index sticker 14 on the read-out electronic mail 13. The electronic mail 13b newly prepared by the user B is transmitted, together with the index sticker 14b, to the users C and D. At this point, the information processing apparatus 10b sends out the electronic mail address of the user B and transfer information including information showing the transfer to other information processing apparatuses to the information providing apparatus 8i via the internet 7. The WWW server 8i having received the transfer information from the information processing apparatus 10b updates the previously stored distribution information on the basis of the transfer information. This enables the information provider by the WWW server 8i to know that the information has further been transferred.

In the same manner as the user B, the users C and D can read out the electronic mail 13b received by the information processing apparatuses 10c and 10d in their possession, and can copy the index sticker 14b in the same manner as described above and transmit the same to other users. As in the information processing apparatuses 10a and 10b, the transfer information is sent out to the WWW server 8i via the internet 7.

Figure 3:
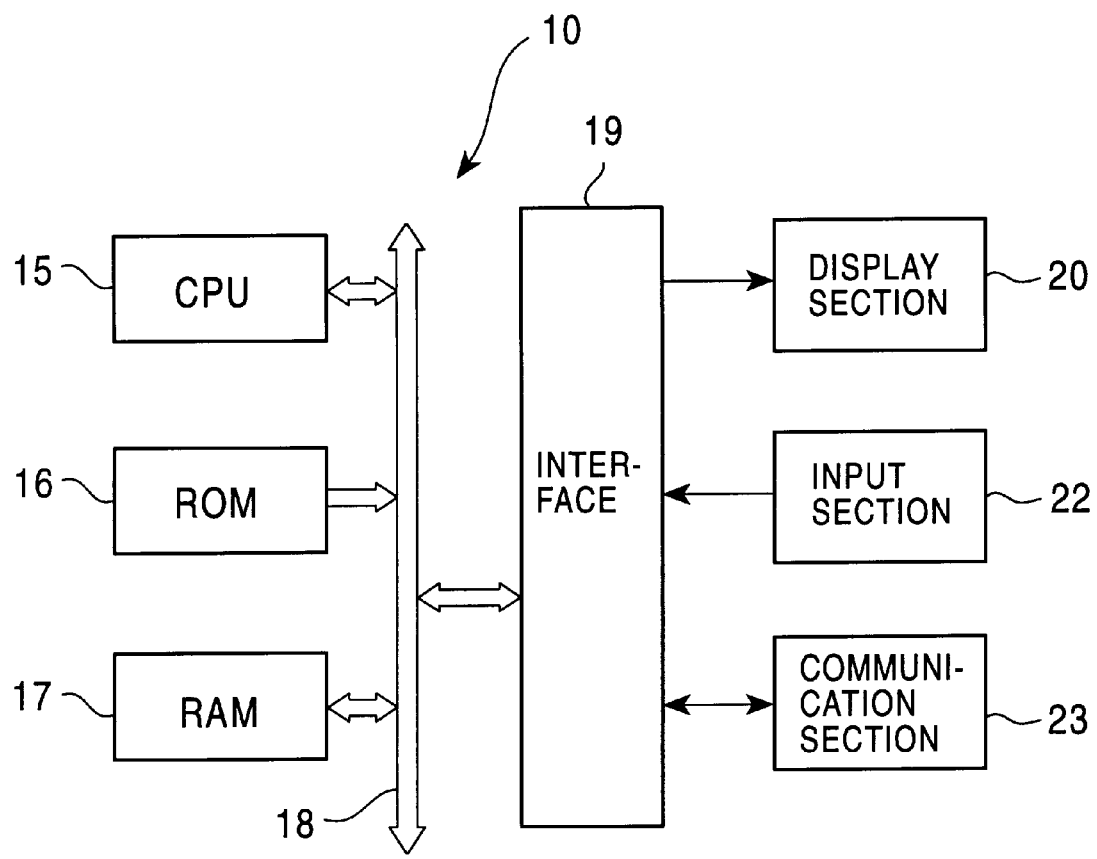
FIG. 3 is a hardware configuration diagram of the information processing apparatus achievable according to the invention.

FIG. 3 is a hardware configuration diagram of the information processing apparatuses 10a, 10b, 10c. . . (hereinafter collectively referred to as "information processing apparatus 10") to which the present invention is applicable.

The information processing apparatus 10 basically comprises a CPU 15, and ROM (Read Only Memory) 16, and RAM (Random Access Memory) 17, a bus 18, an interface 19, a display section 20, an input section 22, and a communication section 23. The CPU 15 is a central processing unit which actually executes various application programs and a basic OS.

The ROM 16 generally stores basically fixed data from among programs used the execution of the CPU 15 and arithmetic parameters. The RAM 17 stores parameters varying from time to time from among programs and parameters used in the execution of the CPU 15. The display section 20 is a display device of CRT or liquid crystal which displays an electronic mail, a home page read out by the WWW browser, and other pieces of information in texts and images. The input section 22 comprises a keyboard for entering texts, and pointing devices (image position instructing devices) such as a mouse for instructing or selecting points on the output screen. This input section 22 permits input of texts such as an actual electronic mail, pasting of images, and transfer operation. The communication section 23 is means for connecting to a communication line such as a public line including ISDN or a LAN (Local Area Network), or more specifically, a modem or various LAN boards. Communication lines such as an LAN are included in the connections because an information processing apparatus connected to an LAN or the like makes it possible to carry out transmission of an electronic mail and hence apply the present invention.

The information processing apparatus 10 of the present invention may as required be connected to a hard disk device, or other peripheral terminal devices such as a CD-ROM device or a floppy disk device. This makes it possible to read out a program stored in an external storage device such as a floppy disk, herein referred to as a providing medium, and also to execute the same by means of the CPU 15.

The hardware configuration of an information providing apparatus such as the WWW server 8i may be the same as the hardware configuration described above. That is, the information providing apparatus, depending upon its functions, strengthens processing functions of the CPU 15, storing functions of storing means of RAM 7 and other added hard disk, and further, communication functions, and does not basically differ from the configuration of the information processing apparatus 10.

Figure 4:
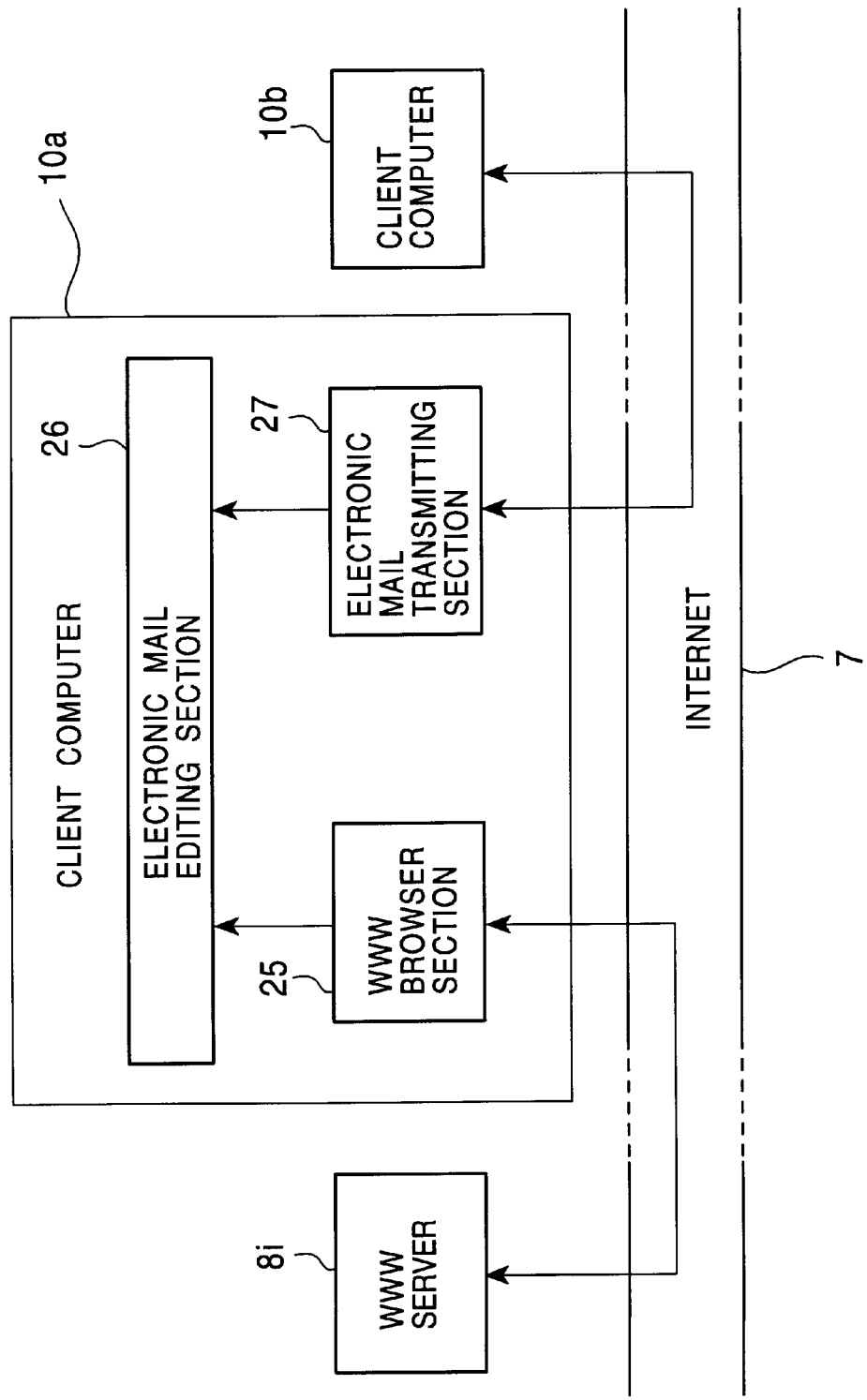
FIG. 4 is a functional block diagram of the information processing apparatus shown in FIG. 2.

FIG. 4 is a functional block diagram of the information processing apparatus 10a shown in FIG. 2, from among the information processing apparatuses 10 of the invention. The information processing apparatus 10a serving as a client computer relative to the WWW server 8i has a WWW browser section 25, an electronic mail editing section 26 and an electronic mail transmitting section 27.

The WWW browser section 25 requests transfer of a home page of the WWW server 8i connected via the internet 7 to the WWW server 8i by net surfing by means of a URL directly entered by the user A or a linked URL, and receives the transferred home page. Further, the WWW browser section 25 displays the contents of information on the display section 20 shown in FIG. 3, and at the same time, as shown in FIG. 2, stores a particular extraction area 12 and the URL of the home page, as an index sticker 14, in storing means such as the RAM 17 of the information processing apparatus 10a.

The electronic mail editing section 26 has a function of editing an electronic mail, and inserts the stored index sticker 14 into the text of the electronic mail. The edited electronic mail including the index sticker 14 is sent to the electronic mail transmitting section 27 in compliance with an electronic mail transmitting command, and is transmitted via the communication section 23 shown in FIG. 3 to the information processing apparatus 10b serving as other client computers.

Figure 5:
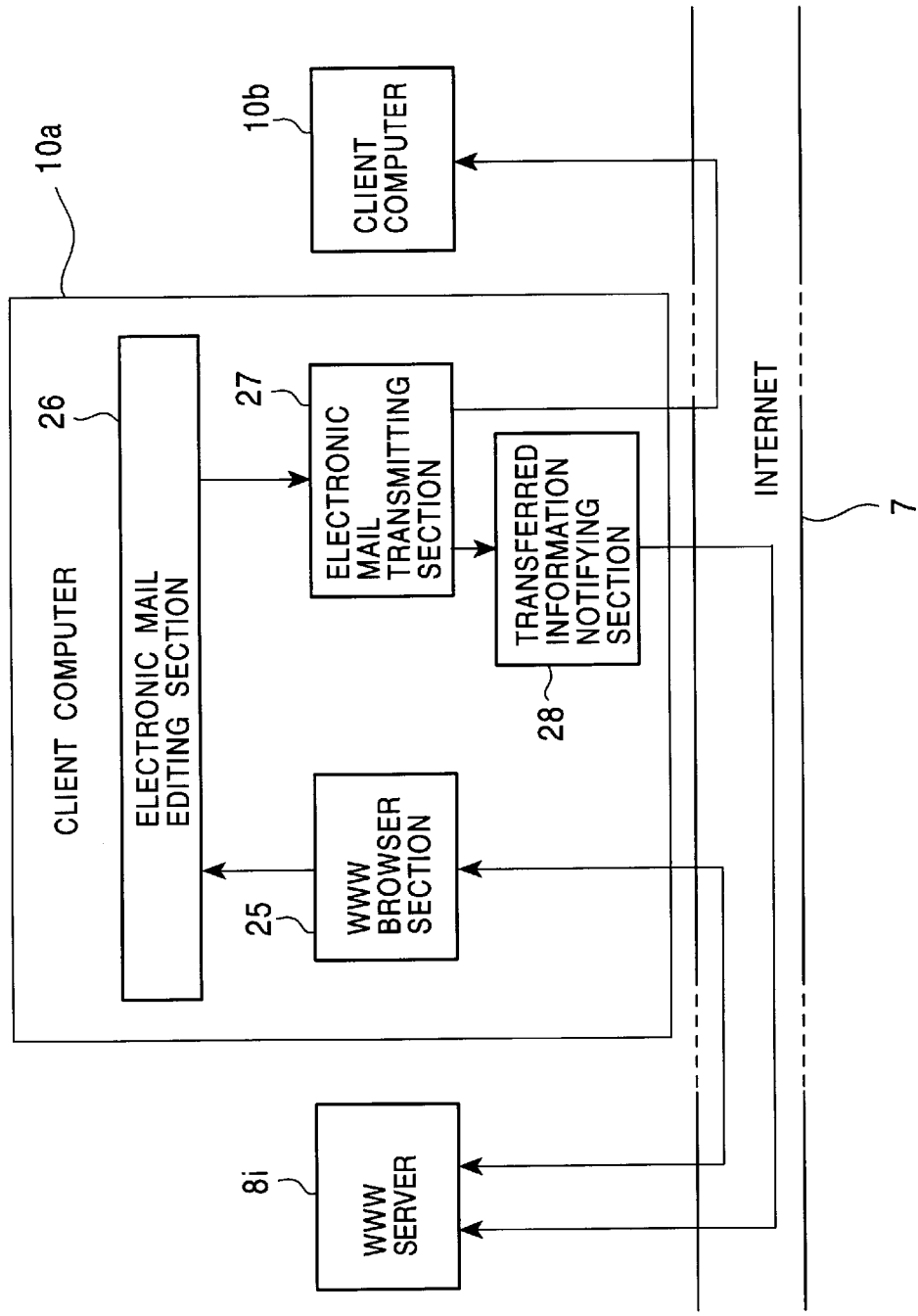
FIG. 5 is another functional block diagram of the information processing apparatus shown in FIG. 2.

FIG. 5 is a functional block diagram illustrating the configuration of another embodiment of the information processing apparatus 10a shown in FIG. 2, in which the transfer information is sent out to the WWW server 8i. In FIG. 5, parts corresponding to those in FIG. 4 are assigned the same reference numerals, of which the description is omitted here. The information processing apparatus 10a serving as a client computer relative to the WWW server 8i has a transfer information notifying section 28.

When an electronic mail is sent by the electronic mail transmitting section 27, the transfer information notifying section 28 sends a transfer information via the internet 7 to the WWW server 8i. The transfer information consists of prescribed transfer data permitting configuration of the transfer of information provided by the WWW server 8i (for example, a home page). As a result, the WWW server 8i can know at least that the information processing apparatus 10a has transferred the information to another information processing apparatus 10b. Details will be separately described later.

Now, the information processing apparatus 10a sending the transfer information to the WWW server 8i which is the information provider, upon transfer of the index sticker 14 as attached to the electronic mail, and the WWW server 8i will be described.

Figure 6:
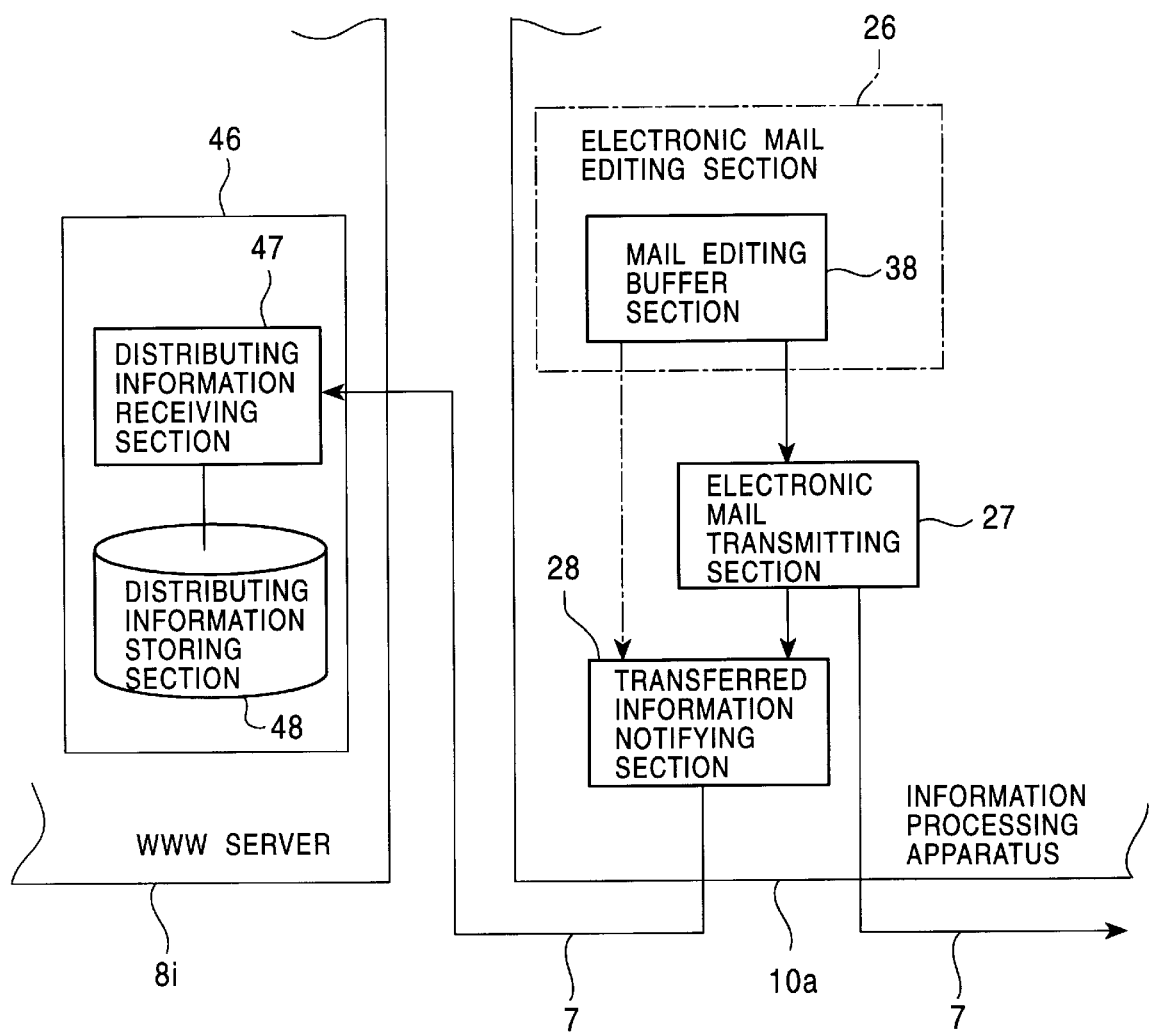
FIG. 6 is block diagram illustrating of a portion pertinent to transmission and receiving of transfer information of the information processing apparatus 10a shown in FIG. 5 and a WWW server 8i.

FIG. 6 is a block diagram illustrating functions of the portion relating to transmission and receiving of a transfer information of the information processing apparatus 10a and the WWW server 8i shown in FIG. 5.

The information processing apparatus 10a has a mail text editing buffer 38, an electronic mail transmitting/receiving section 27 and a transfer information notifying section 28. On the other hand, the WWW server 8i has a distribution information managing section 46 comprising a distribution information receiving section 47 and a distribution information storing section 48.

The mail text editing buffer section 38 stores text data regarding an electronic mail entered via the input section 22 shown in FIG. 3, an index sticker 14, and other data such as image data.

The electronic mail transmitting section 27 transmits an electronic mail stored in the mail text editing buffer section 38 in compliance with a transmitting command of electronic mail, and checks up whether or not an index sticker 14 has been pasted to the electronic mail. When determining that the index sticker 14 has been pasted to that electronic mail, the electronic mail transmitting section 27 communicates the address information of the information provider added to the electronic mail to the transfer information notifying section 28. Further, when the electronic mail has been transmitted to a plurality of users with the same text, the number of receiving users is also communicated to the transfer information notifying section 28, in addition to the address information of the provider.

Upon receipt of the address information and the like, the transfer information notifying section 28 accesses the WWW server 8i in which the transferred information is actually present via the network 7 by using the address information thereof. A response is requested to the WWW server 8i by the use of the host name and the domain name in the URL of the home page, and after receipt of a response to the response request from the WWW server 8i, the information processing apparatus 10a transmits the transfer information consisting of prescribed data which shows that the information has been transferred by electronic mail or the number of users, and address information of the information provider to the WWW server 8i.

On the other hand, the WWW server 8i responds to the response request from the information processing apparatus 10a, and starts the distribution information receiving section 47, to prepare for receiving the transfer information sent from the information processing apparatus 10a. Thereafter, the distribution information receiving section 47 receives the transfer information sent from the information processing apparatus 10a and specifies the information provided by the WWW server 8i from the address information in the received transfer information. For example, the section 47 specifies an HTML file name of the transferred home page from the portion of the URL, which is the address information, corresponding to the file name. The distribution information storing section 48 sums up the numbers of destination users of transfer on the basis of the transfer information for each piece of information specified by the distribution information receiving section 47 and stores the same. This makes it possible for the information provider of the WWW server 8i to know at least to how many users the information he provided has been transferred.

In the foregoing case, the transfer information has included prescribed data showing that the information has been transferred, or/and the number of receiving users of transfer. The transfer information may however contain the electronic mail address of the user of the information processing apparatus 10a (i.e., the electronic mail address of the transferrer), or the electronic mail addresses of the receiving users of transfer (users B of the information processing apparatus 10b in this case) in place of, or together with, the data and the number of receiving users of transfer. As a result, the information provider by the WWW server 8i can store distribution information showing who has copied and distributed the information, or to whom the information has been distributed, in the distribution information storing section 48, thus making it possible to know a more detailed status of transfer. Further, the transfer information may contain time date showing the data and time of the day when the electronic mail has been transmitted. It is thus possible to store a new time data for every update of the distribution information stored in the distribution information storing section 48, hence to determine a frequency of transfer for each time interval. By storing the time of update of the distribution information stored in the distribution information storing section 48 as time data in, place of entering the time data into the transfer information, it is possible to easily know changes in transfer for each of the time intervals.

Figure 7:
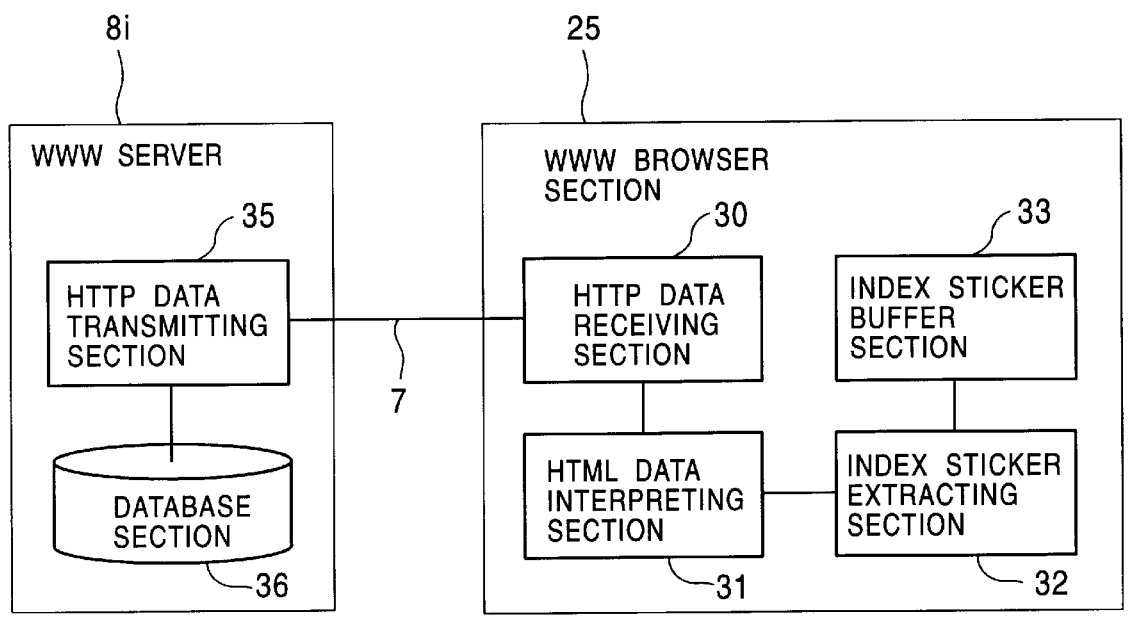
FIG. 7 is a functional diagram illustrating the WWW browser section shown in FIG. 4, relative to a WWW server.

FIG. 7 is a functional block diagram of the WWW browser section 25 shown in FIG. 4 relative to the WWW server 8i. The WWW browser section 25 has an HTTP data receiving section 30, an HTML data interpreting section 31, an index sticker extracting section 32, and an index sticker buffer section 33. The WWW server 8i has on the other hand an HTTP data transmitting section 35 and a database section 36.

The database section 36 stores the HTML file containing the home page and other information, other HTML files correlated with the HTML file and a pointer of a link, and other pieces of information such as image data. The HTTP data transmitting section 35 transmits a home page comprising an HTML file and information pertinent thereto to the information processing apparatus 10a connected to the internet 7.

The HTTP data receiving section 30 of the WWW browser section 25 stores the home page received from the HTTP data transmitting section 35 and correlated information (hereinafter referred to as the "home page and the like") in the RAM 17. The stored home page and the like are interpreted by the HTML data interpreting section 21, and displayed on the display section 20 such as a CRT or a liquid crystal screen shown in FIG. 3 in a display format as defined by HTML. The pointer of the linked image file is image-displayed in the form of an actual image by selecting the position of display thereof through a click by a mouse. The user A of the information processing apparatus 10a can therefore configure the image file consisting of image data as image information.

The user A can select an arbitrary area of the displayed home page, i.e., a part of an image display for example, by the use of a pointing device such as a mouse in the index sticker extracting section 32. The area selected by the user is extracted in an image data format, and stored in the index sticker buffer section 33, together with the URL which is the address information of that home page, as an index sticker 14 (see FIG. 2).

The information contained in the home page often contains information such as an image file provided by a WWW server other than the WWW server 8i. In the HTML document of the home page, the URL which is the address information of the WWW server having provided that image file is linked. Therefore, when the user A selects the area in which the image file is image-displayed as the extraction area, the conceivable address information stored as the information provider in the index sticker buffer section 33 is the address information of the home page of the WWW server 8i, or the address information of the provider of that image file. In the invention, setting may be made for any of these pieces of address information, or the user may arbitrarily select any of these pieces of address information. The address information of the information provider as used in the invention therefore represents any of the address information of that home page and the address information of the location where the extracted data are actually present.

At this point, the display section 20 such as a CRT shown in FIG. 3 displays the image from the image memory stored in the bit map format in general onto the screen. In order to extract an arbitrary area as described above as image data, therefore, it suffices to read out only bit data corresponding to the area selected by the pointing device from among the bit data stored in the image memory, for example. In order to extract image information image-displayed in the home page, for example, a part of information from a GIF (Graphics Interchange Format) image file as image data, it suffices to use the foregoing method, or, to extract, from the image information, an area corresponding to a pixel area specified by the pointing device from among longitudinal and transverse pixel areas specifying the image information area displayed on the display section 20. When, for example, a GIF file is displayed, in a home page, with a pixel area of 0 to 300 pixels longitudinally and 20 to 180 pixels transversely, and the pointing device specifies a pixel area of 50 to 230 pixels longitudinally and 50 to 130 pixels transversely, only image data within the pixel area specified by the GIF file may be extracted. These methods area only examples, and any method or means may be adopted so far as it is possible to extract image data. Applicable image data include TIFF (Tagged Image File Format), and BMP data other than GIF data.

Figure 8:
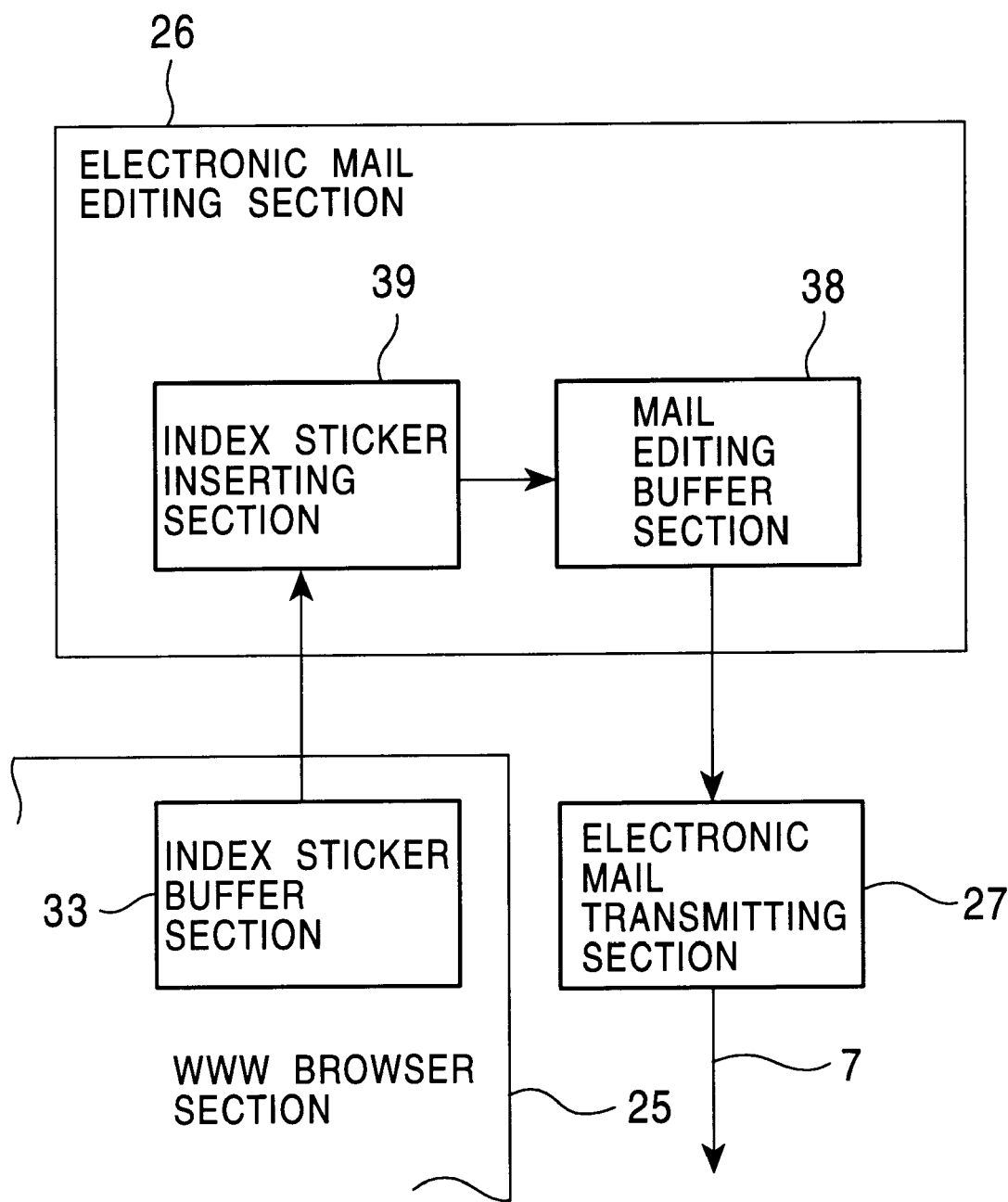
FIG. 8 is a functional diagram illustrating the electronic mail editing section shown in FIG. 4, relative to an index sticker buffer section and an electronic mail transmitting section.

FIG. 8 is a functional block diagram illustrating the electronic mail editing section 26 shown in FIG. 4 in terms of the relationship between the index sticker buffer section 33 and the electronic mail transmitting section 27. The electronic mail editing section 26 has a mail text editing buffer section 38 and an index sticker inserting section 39.

The mail text editing buffer section 38 stores text data entered via the input section 22 shown in FIG. 3, and other data such as image data. The index sticker inserting section 39 stores the index sticker 14 stored in the index sticker buffer section 33 into the mail text editing buffer section 38. The stored text data and image data of the index sticker 14 are text-displayed and image-displayed, respectively, on the display section 20 shown in FIG. 3.

Now, operations will be described below. The user A can enter a text, via the input section 22, onto the electronic mail editing screen displayed on the display section 20 shown in FIG. 3. The entered text is stored as text data into the mail text editing buffer section 38. Further, when the user is to insert the index sticker 14 stored in the index sticker buffer section 33 into the text of the electronic mail in editing, it suffices to select an icon provided for the insertion of the index sticker on the electronic mail screen. When the icon is selected by means of a pointing device such as a mouse, the index sticker inserting section 39 is started, and the index sticker 14 already stored in the index sticker buffer section 33 is displayed on the electronic mail screen. Further, when the displayed index sticker 14 is selected, and image of the index sticker 14 is inserted by image display at a position specified by the cursor on the electronic mail screen. At this point, the index stickers 14 containing the URL which is address information is in storage in the mail text editing buffer section 38. The index sticker inserting section 39 may be capable of causing the displayed index sticker 14 to move to any position in the electronic mail text by user's operation of a mouse or the like. When a plurality of index stickers 14 are stored in the index sticker buffer section 33, they may be arranged on the screen so as to permit independent selection of each of them.

The electronic mail transmitting section 27 transmits the electronic mail stored in the mail text editing buffer section 38, together with the index sticker 14, via the internet 7 to the information processing apparatus 10b of the user B shown in FIG. 2 in compliance with an electronic mail transmitting command prepared in the electronic mail editing section 26.

Figure 9:
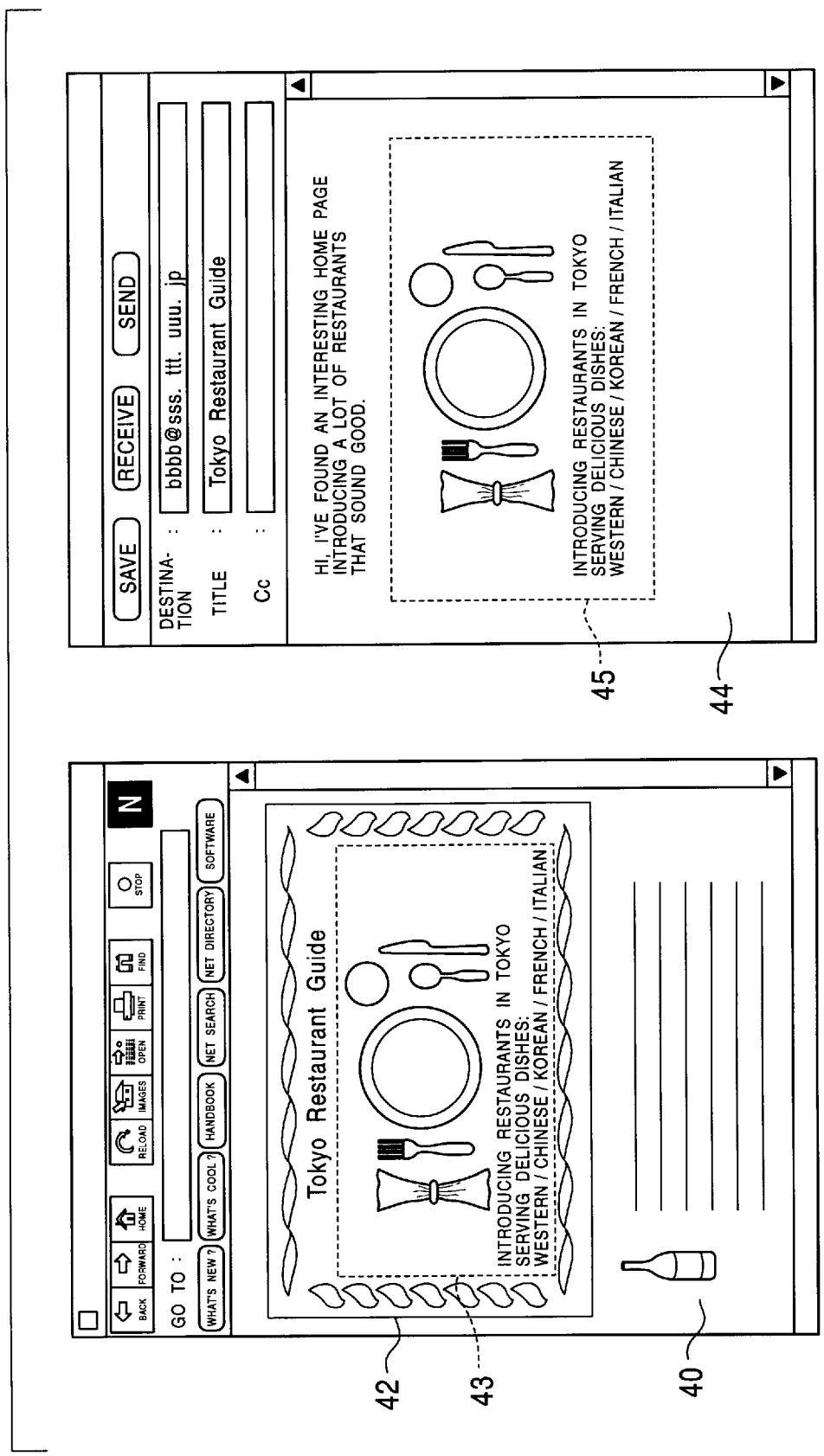
FIG. 9 illustrates typical home page display screen and electronic mail display screen, as displayed on the display section of the information processing apparatus.

FIG. 9 illustrates a home page display screen 40 read out by the WWW browser section 25 from a home page of the WWW server 8i in the display section 20 of the information processing apparatus 10a, and an electronic mail display screen 44 displaying the electronic mail stored in the mail text editing buffer section 38 of the electronic mail editing section 26.

The image data surrounded by solid line 42 are image-displayed on the browser display screen 40, within which a thick dotted line 43 indicates user's selection through mouse operation. Therefore, the area enclosed by the thick dotted line 43 is stored as the index sticker 14 in the index sticker buffer section 33 shown in FIG. 7.

On the electronic mail display screen 44, image data stored as the index sticker 14, in addition to the text-entered text, are image-displayed as surrounded by the thick dotted line 45. As described above, these image data have been inserted in to the text of the electronic mail by the index sticker inserting section 39, and stored in the mail text editing buffer section 38.

Now, the information processing apparatus receiving the electronic mail having the index sticker 14 will be described.

Figure 10:
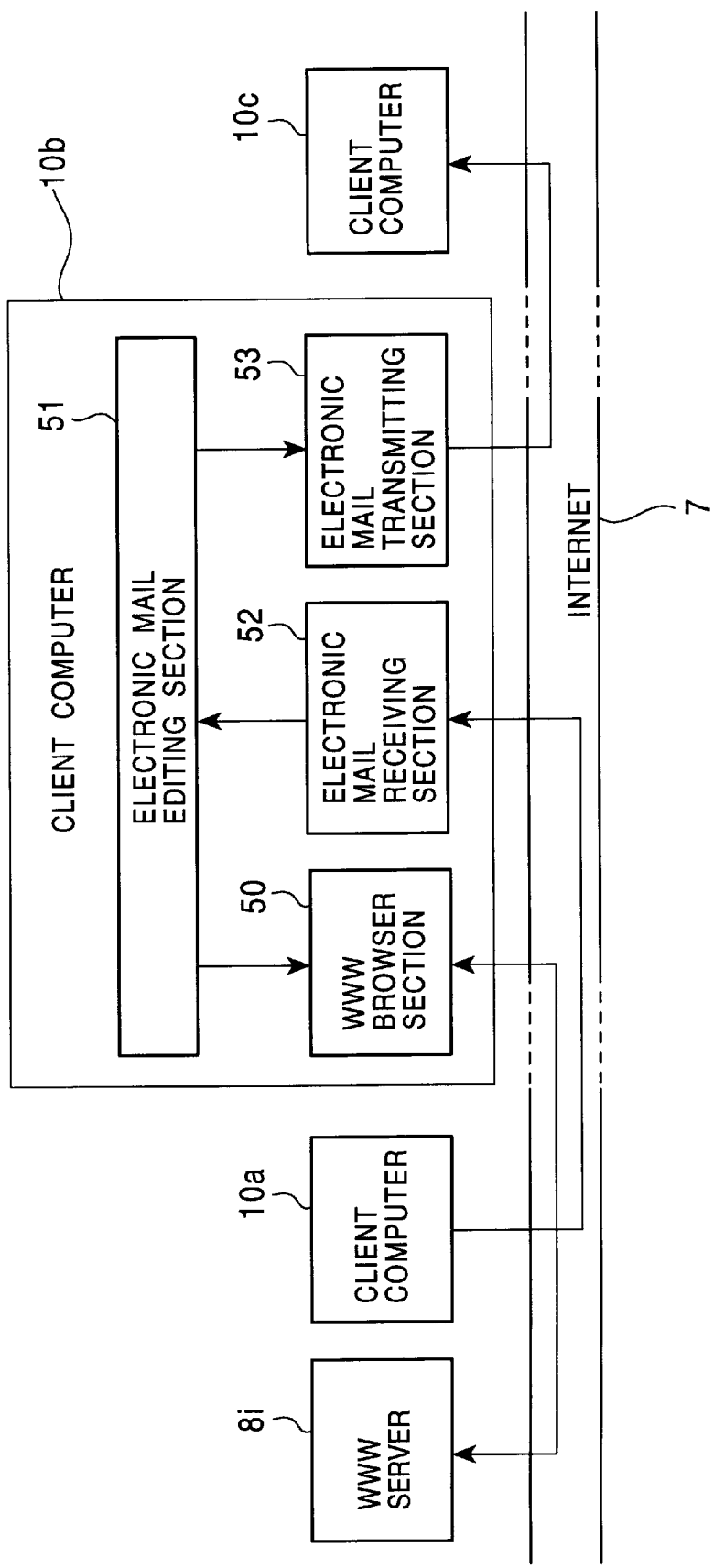
FIG. 10 is a functional block diagram of the information processing apparatus shown in FIG. 2.

FIG. 10 is a functional block diagram of the information processing apparatus 10b shown in FIG. 2 from among the information processing apparatuses 10 of the invention. The information processing apparatus 10b serving as a client computer has a WWW browser section 50, an electronic mail editing section, and an electronic mail receiving section 52, and an electronic mail transmitting section 53. The WWW browser section 50 and the electronic mail transmitting section 53 may be the same as the WWW browser section 25 and the electronic mail transmitting section 27 of the information processing apparatus 10a described with reference to FIGS. 7 and 8. Description of the functions in duplication is therefore omitted here. The hardware has a configuration as shown in FIG. 3 above.

The electronic mail receiving section 52 receives an electronic mail from another information processing apparatus 10a via the network 7 connected by the communication section 23 shown in 23.

Figure 11:
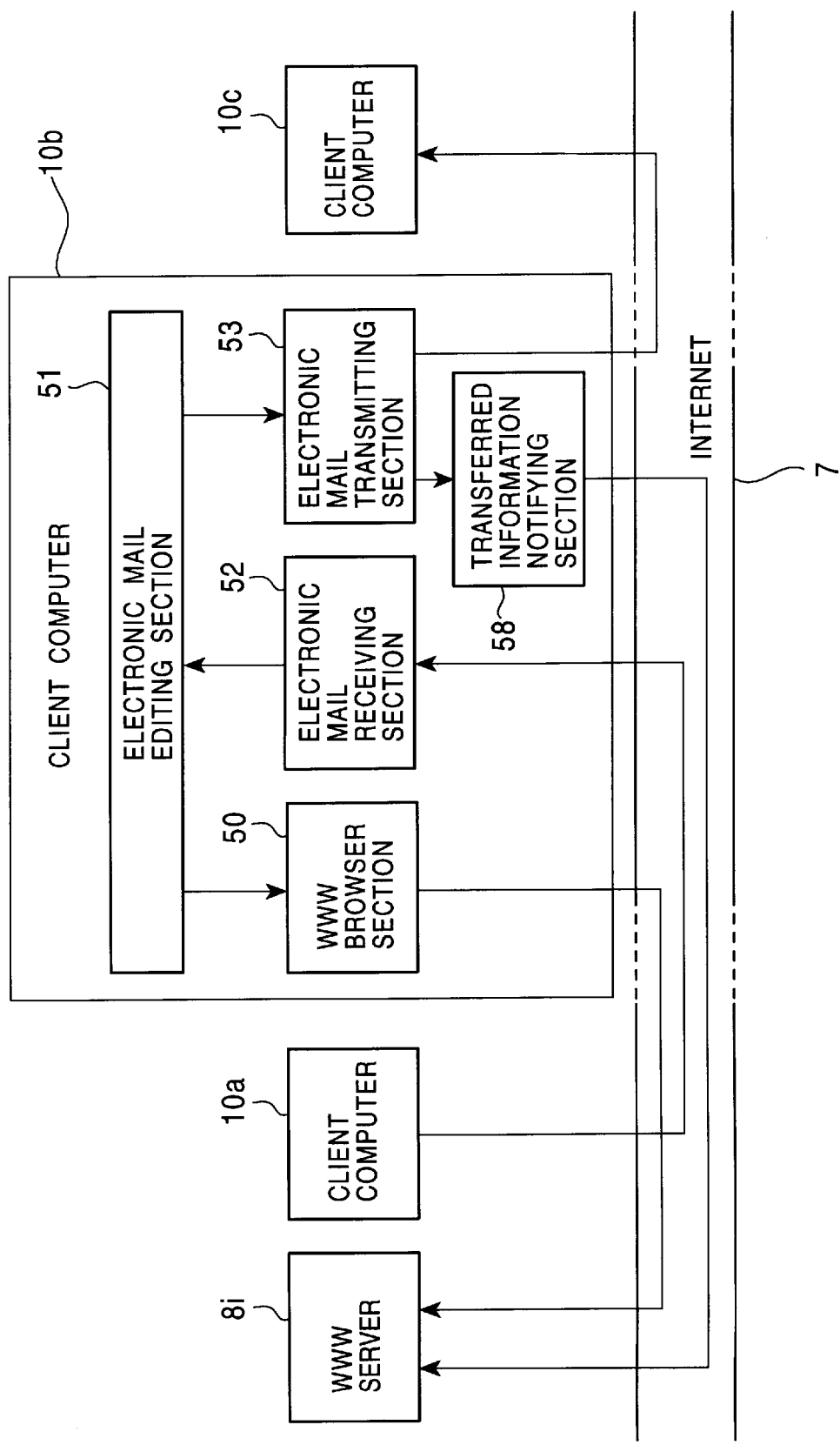
FIG. 11 is another functional block diagram of the information processing apparatus shown in FIG. 2.

FIG. 11 is a functional diagram illustrating a configuration of another embodiment of the information processing apparatus 10b shown in FIG. 2 from among the information processing apparatuses 10 of the invention. In FIG. 11, the components corresponding to those in FIG. 10 are assigned the same reference numerals of which the description is omitted here. The information processing apparatus 10b serving as a client computer has a transfer information notifying section 58. The transfer information notifying section 58 shown in FIG. 11 for notifying the transfer information to the WWW server 8i may be the same as the transfer information notifying section 28 described above with reference to FIG. 5.

Even when the user having received a part of the information provided by the WWW server transfers again the same to other users, therefore, notification of the transfer information to the WWW server 8i is ensured. As a result, the information provider can know the number of users receiving the transfer information and the like every time the index sticker is transferred between users. The information added, together with the address information, to the electronic mail may be information sent by an electronic mail after read-out from another information processing apparatus, as shown in FIG. 11, in addition to the information read out from the information providing apparatus in the information processing apparatus having the electronic mail editing section as shown in FIG. 5.

Figure 12:
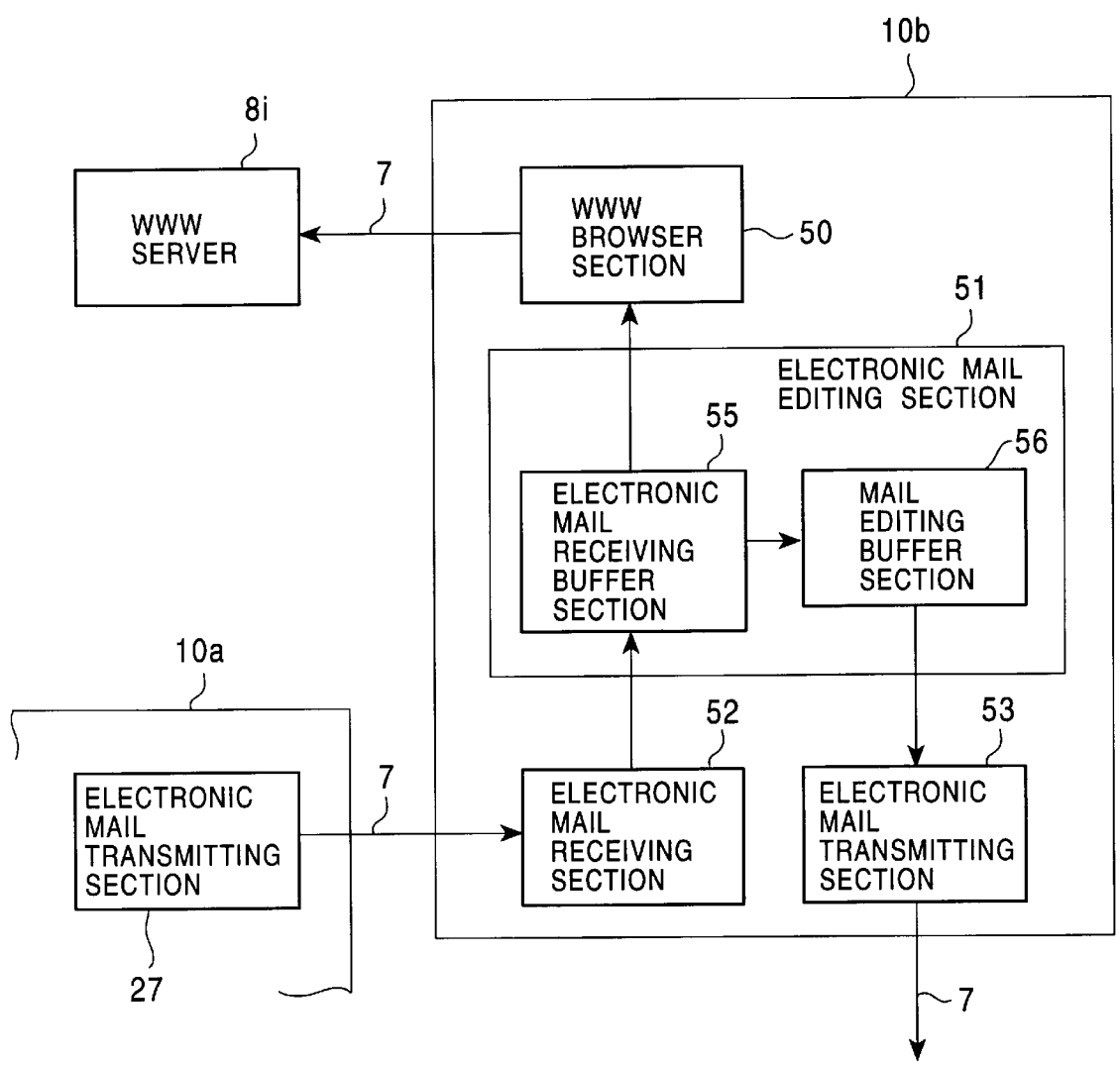
FIG. 12 is a more detailed functional block diagram of the information processing apparatus according to the invention, as illustrated around the electronic mail editing section 51 shown in FIG. 10.

FIG. 12 is a more detailed functional block diagram of the information processing apparatus 10b of the invention, centering around the electronic mail editing section 51 shown in FIG. 10.

The electronic mail editing section 51 has an electronic mail receiving buffer section 55, and a mail text editing buffer section 56. The mail text editing buffer section 56 is the same as the mail text editing buffer section 38 of the information processing apparatus 10a described above with reference to FIG. 8. Therefore, the electronic mail editing section 51 will be described below, centering around the electronic mail receiving buffer section 55.

The electronic mail received by the electronic mail receiving section 52 from the information processing apparatus 10a via the internet 7 is sent to, and stored in, the electronic mail receiving buffer section 55. The stored electronic mail is displayed by the display section 20 shown in FIG. 3. At this point, image data of the index sticker 14 contained in the electronic mail are image-displayed, and the user B can easily know an overview of the home page. The URL of the home page accompanying the index sticker 14 is also stored in the electronic mail receiving buffer section 55. When the user B selects the image-displayed index sticker 14 by clicking the mouse, for example, the WWW browser section 50 is started, and the address information of the URL accompanying the index sticker 14 is sent out from the electronic mail receiving buffer section 55 to the WWW browser section 50. The WWW browser section 50 having received the URL accesses the WWW server 8i which is the provider of the information of the index sticker 14, i.e., the home page on the basis of the address information of the URL, and requests transfer of the home page. The home page received from the WWW server 8i is displayed on the display section 20 shown in FIG. 3, thus enabling the user to read out the whole view of the home page showing the index sticker 14.

Further, with a view to permitting transfer of the index sticker 14 from the user B to other users C and D as shown in FIG. 2, the index sticker 14 saved in the electronic mail receiving buffer section 55 can be stored in the mail text editing buffer section 56. Because the index sticker 14 contains the pertinent URL, the users C and D having received the electronic mail from the user B can easily access the home page of the index sticker 14 as the user B.

The inserting operation of the index sticker 14 described above with reference to FIG. 7 is accomplished in the WWW browser section 25. The index sticker may be prepared previously on the WWW server.

Figure 13:
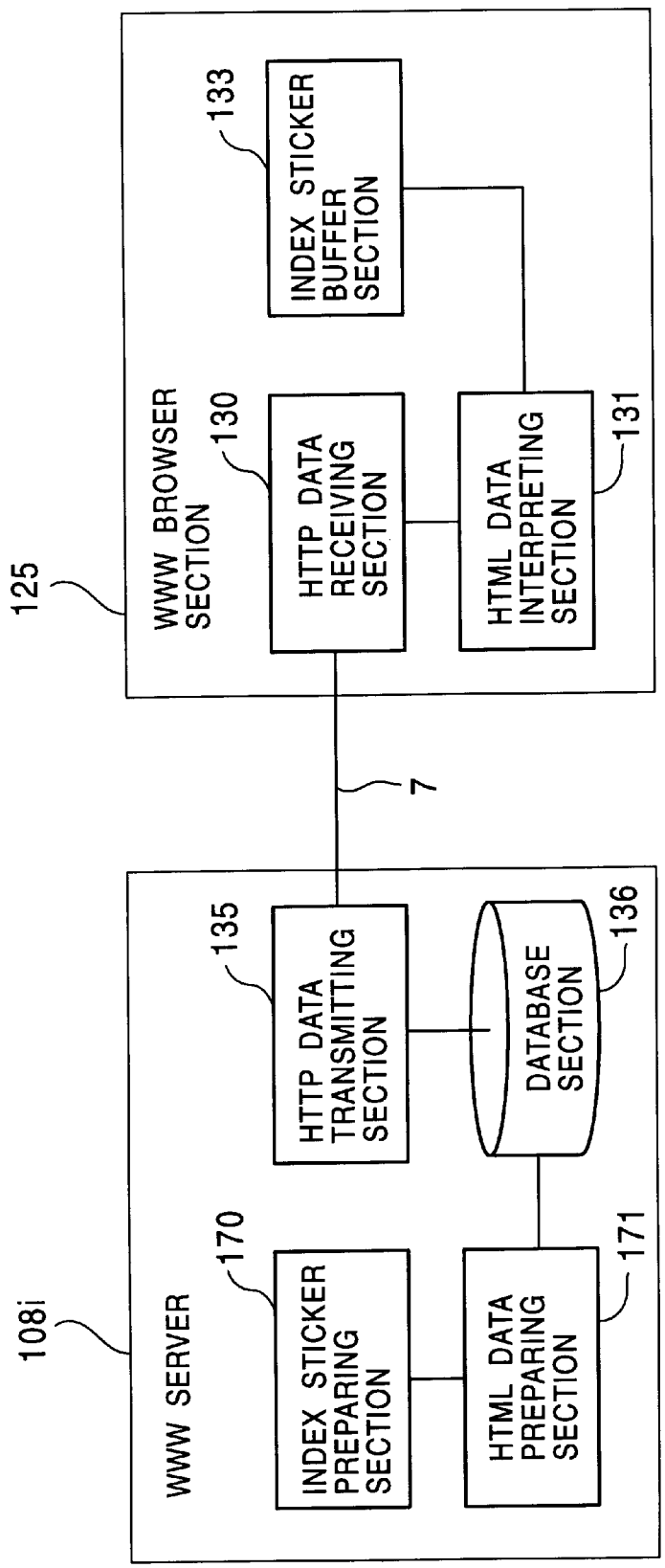
FIG. 13 is a functional block diagram of a WWW server and a WWW browser section in a second embodiment of the invention.

FIG. 13 is a functional block diagram of a WWW server 108i and a WWW browser section 125 in a second embodiment of the invention. The WWW server 108i and the WWW browser section 125 are applicable in place of the WWW server 8i and the WWW browser section 25 shown in FIG. 7. The WWW server 108i has an HTTP data transmitting section 135 and a database section 136 identical with the HTTP data transmitting section 35 and the database section 36 of the WWW server 8i, and in addition, has an index sticker preparing section 170 and an HTML data preparing section 171. On the other hand, the WWW browser section 125 has a configuration in which the index sticker extracting section 32 composing the WWW browser section 25 shown in FIG. 7 is omitted.

An overview and main pieces of information out of the information displayed in a home page are prepared as image data by the index sticker preparing section 170 of the WWW server 108i, and an index sticker which is index information added with a URL, address information of that home page is prepared.

The HTML data preparing section 171 plays a role of editing a document known as an HTML document, and can insert an index sticker containing the URL at an appropriate position in the HTML document. The home page comprising the HTML document including the index sticker is stored in the database section 136, and is provided as a home of the WWW server 108i onto the internet. The URL used at this point may be either an address providing that home page, or the address of the actual information provider of the information shown in the index sticker (in the invention, therefore, the information provider is either the address of the home page, or the address of the information provider of that index sticker). As a result, it is possible to include a plurality of index stickers in the home page, and efficiently provide various pieces of information by assigning different addresses.

On the other hand, when the WWW browser section 125 of the information processing apparatus 10a accesses a home page containing the index sticker, the HTTP data transmitting section 135 transmits the home page stored in the database section 136 of the WWW server 108i to the HTTP data receiving section 130 of the WWW browser section 125. The HTTP data receiving section 130 downloads the same, and sends it to the HTML data interpreting section 131. The home page is interpreted into displayable information by the HTML data interpreting section 131, and the contents thereof are displayed on the display section 20 shown in FIG. 3. At this point, the index sticker is also image-displayed, and the index sticker and the URL are stored in the index sticker buffer section 133.

The process subsequent to the insertion of the index sticker stored in the index sticker buffer section 133 into the electronic mail and the transfer thereof to other users is the same as that described above with reference to FIG. 8.

Figure 14:
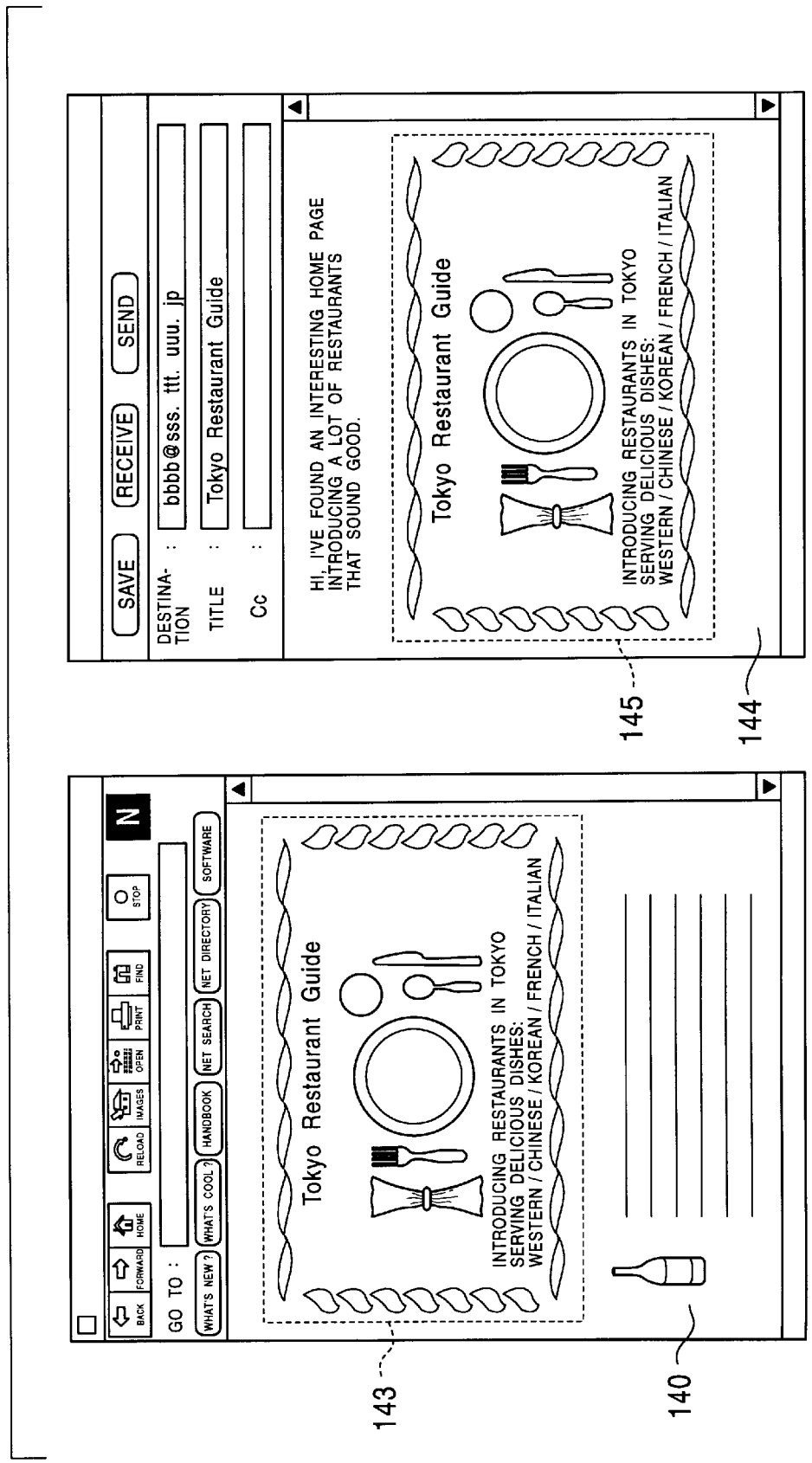
FIG. 14 illustrates typical home page display screen and electronic mail display screen obtained in the second embodiment of the invention shown in FIG. 13.

FIG. 14 illustrates a home page display server 140 displayed on the display section 20 by the browser section 125 reading in, and an electronic mail display screen 144 displayed by the electronic mail editing section, in the configuration shown in FIG. 13.

The home page display screen 140 has an image display area serving as an extraction area 143. This extraction area 143 is the index sticker which has previously been prepared by the index sticker preparing section 170 and the HTML data preparing section 171 of the WWW server 108i and then pasted as described above, and is an image display of the data stored as image data in the index sticker buffer section 133. The index sticker is pasted in the text of the electronic mail in the same manner as above, and serves as the image display 145.

Then, by specifying the portion of the index sticker pasted on the electronic mail on the screen so as to attach a comment of the sender of the electronic mail (the attached comment is hereinafter referred to as the "comment sticker"), the information as the index sticker can be more effectively communicated.

Figure 15:
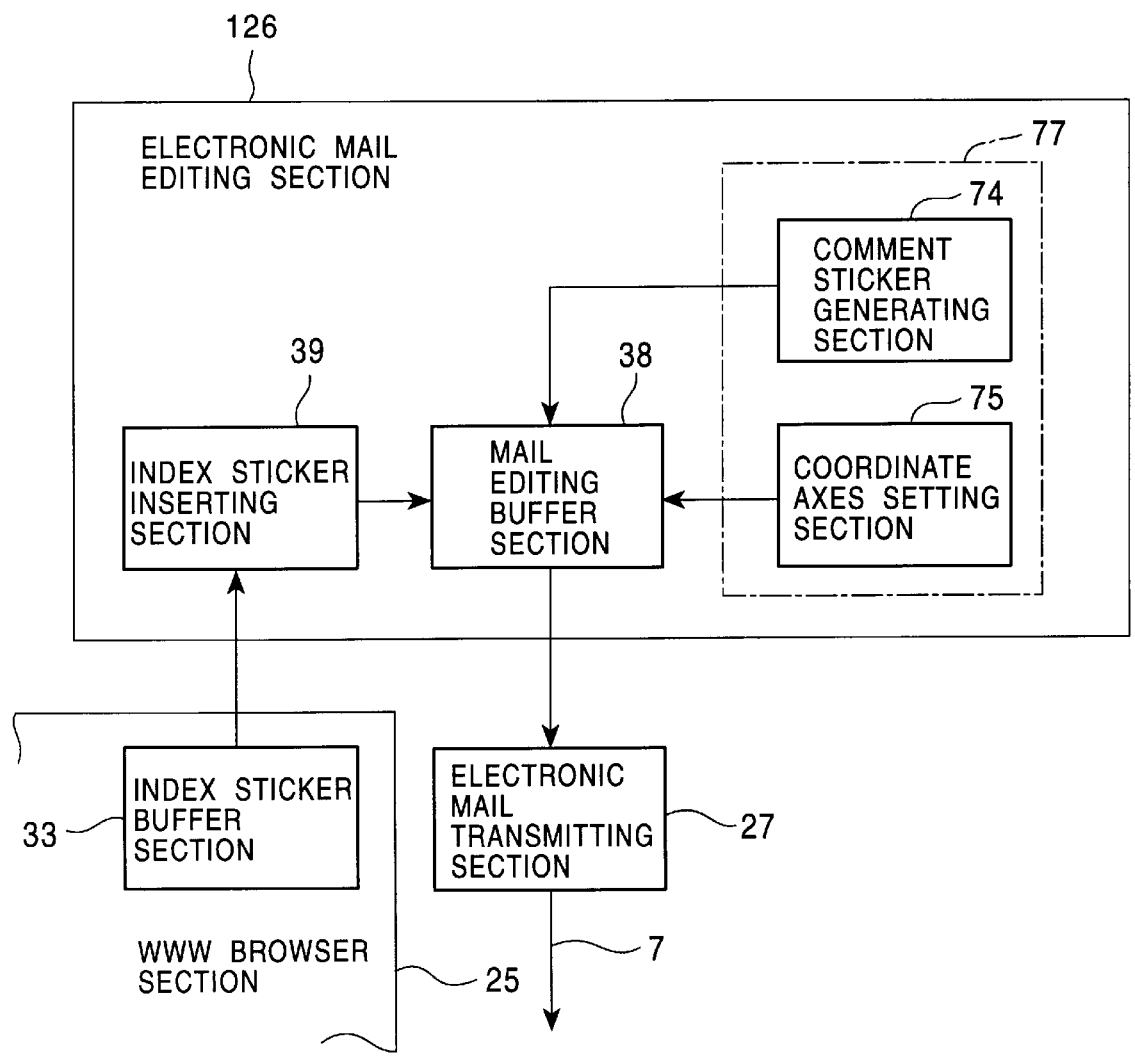
FIG. 15 is a functional block diagram of an electronic mail editing section added with a function for attachment of a comment sticker.

FIG. 15 is a block diagram of an electronic mail editing section 126 added with a new function to add such a comment sticker. The electronic mail editing section 126 shown in FIG. 15 has a comment sticker preparing section 74 and a coordinates setting section 75 anew as shown by a dotted line 77, in addition to the index sticker inserting section 39 and the mail text editing buffer section 38 of the electronic mail editing section 26 shown in FIG. 8.

Figure 16:
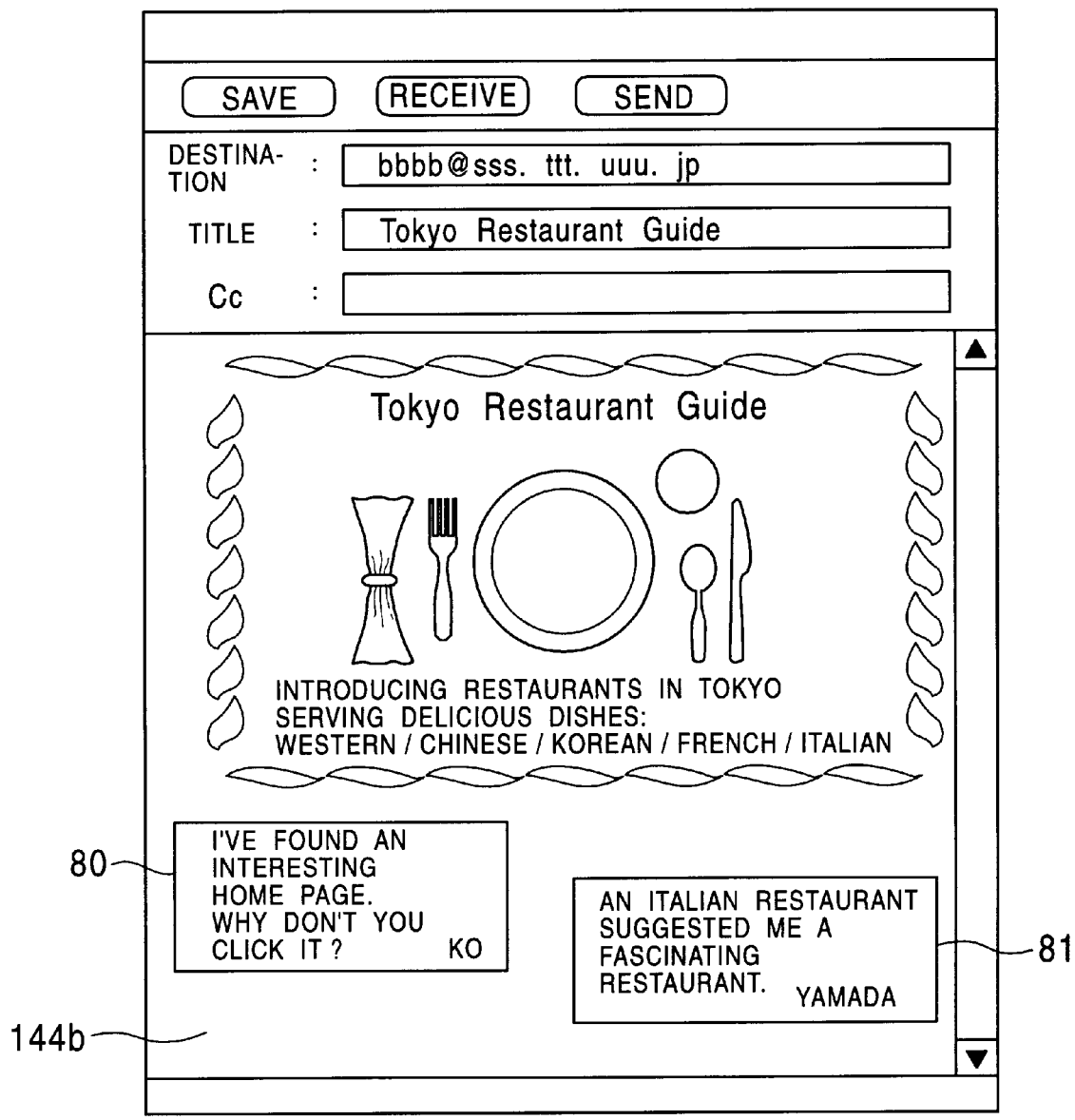
FIG. 16 illustrates a typical electronic mail display screen attached with a comment sticker.

FIG. 16 illustrates a typical display screen 144b of the electronic mail in which comment stickers 80 and 81 are attached to the electronic mail shown in FIG. 14. In this example, the comment stickers 80 and 81 show that the comment stickers have been pasted by different users, and transferred by the electronic mail.

Referring again to FIG. 15, the text information entered by the input section 22 of FIG. 3 is sent to the comment sticker preparing section 74. The comment sticker preparing section 74 prepares a rectangular comment sticker, insets previously sent text information, and pastes the comment sticker onto the electronic mail. The coordinates setting section 75 correlates coordinates on the electronic mail specified by the pointing device with the index sticker and the comment sticker so as to enable the pasted index sticker and comment sticker to move to a position instructed by the operation of the pointing device such as a mouse, and arrange the index sticker and the comment sticker at positions set on the electronic mail. The coordinates may be either relative coordinates as compared with another text document, or absolute coordinates on the electronic mail or any other data so far as a position on the electronic mail can be specified (hereinafter referred to as "positional data"). Further, the coordinates setting section may allow setting the size data of image displays on the electronic mail of the index sticker and the comment sticker (for example, coordinate values of width and height). This permits adjustment of the image display size on the display section 20 by operating the pointing device.

The electronic mail pasted with the index sticker and the comment sticker is sent to the electronic mail transmitting section 27 in compliance with a transmitting command of the electronic mail, and transmitted to other information processing apparatuses via the internet 7 connected by the communication section 23. The data transmitted at this point include the text composing the electronic mail, address information of the index sticker, the comment sticker and the URL, as well as the positional data and size data of the stickers.

Upon receipt of the electronic mail by the information processing apparatus, the information is received by the electronic mail receiving section 52 of the information processing apparatus 10b, and stored in the electronic mail receiving buffer section 55 as shown in FIGS. 10 and 12. The process subsequent to storage carried out by the electronic mail receiving buffer section 55 and the mail text editing buffer section 56 is the same as that described above, and the description is therefore omitted here. However, the electronic mail receiving buffer section 55 contains, in addition to the image data and the URL, the positional data and the size data of the index sticker and the comment sticker. Therefore, the index sticker and the comment sticker are image-displayed on the display section 20 shown in FIG. 3, in response to the positional data and the size data, by the electronic mail editing section 51.

While the comment sticker containing the comment is on ly pasted on the electronic mail screen in FIG. 16, the effect of the comment sticker can be increased by adding a pointer extending so as to point from the comment sticker toward the index sticker.

Figure 17:
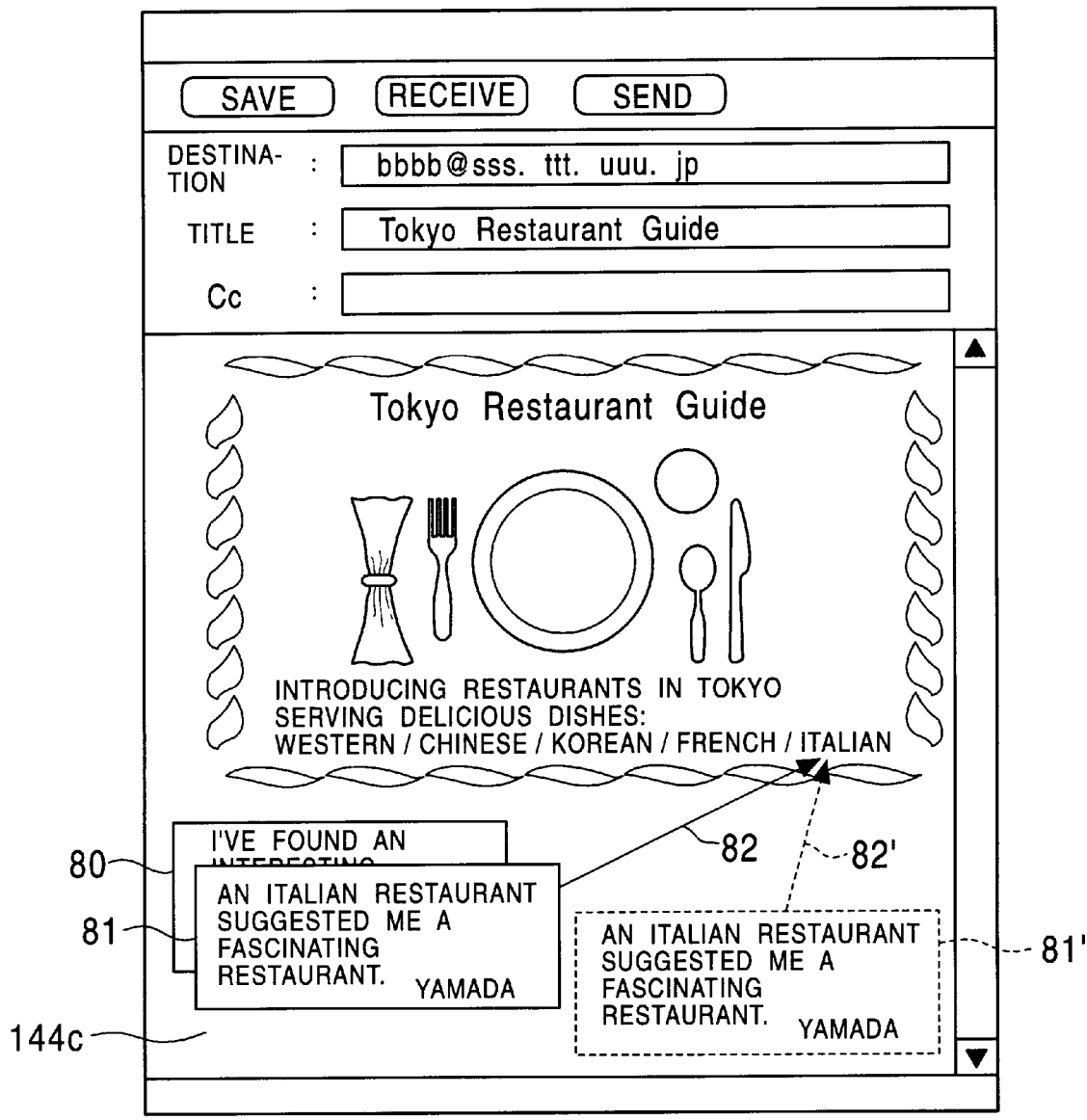
FIG. 17 illustrates a typical electronic mail display screen attached further with a pointer in addition to that shown in FIG. 16.

FIG. 17 illustrates an example of the electronic mail display screen 144c having a configuration in which a pointer 82 is added to the electronic mail display screen 144b shown in FIG. 16. The comment sticker 81' and the pointer 82' shown by dotted lines represent a state before displacement, and the comment sticker 81 and the pointer 82 shown by solid lines represent the state after displacement by the pointing device.

In the coordinates setting section 75 shown in FIG. 15, starting point coordinates and end point coordinates of the pointer 82 are set to display the pointer at a particular position. The starting point coordinates are set in the coordinates setting section 75 so that the starting point is located at the same display position of the comment sticker irrespective of a displacement of the comment sticker or expansion or contraction of the comment sticker. Similarly, end point coordinates are set in the coordinates setting section 75 so that the end point is located at the same display position of the index sticker irrespective of a displacement or expansion or contraction of the index sticker.

Figure 18:
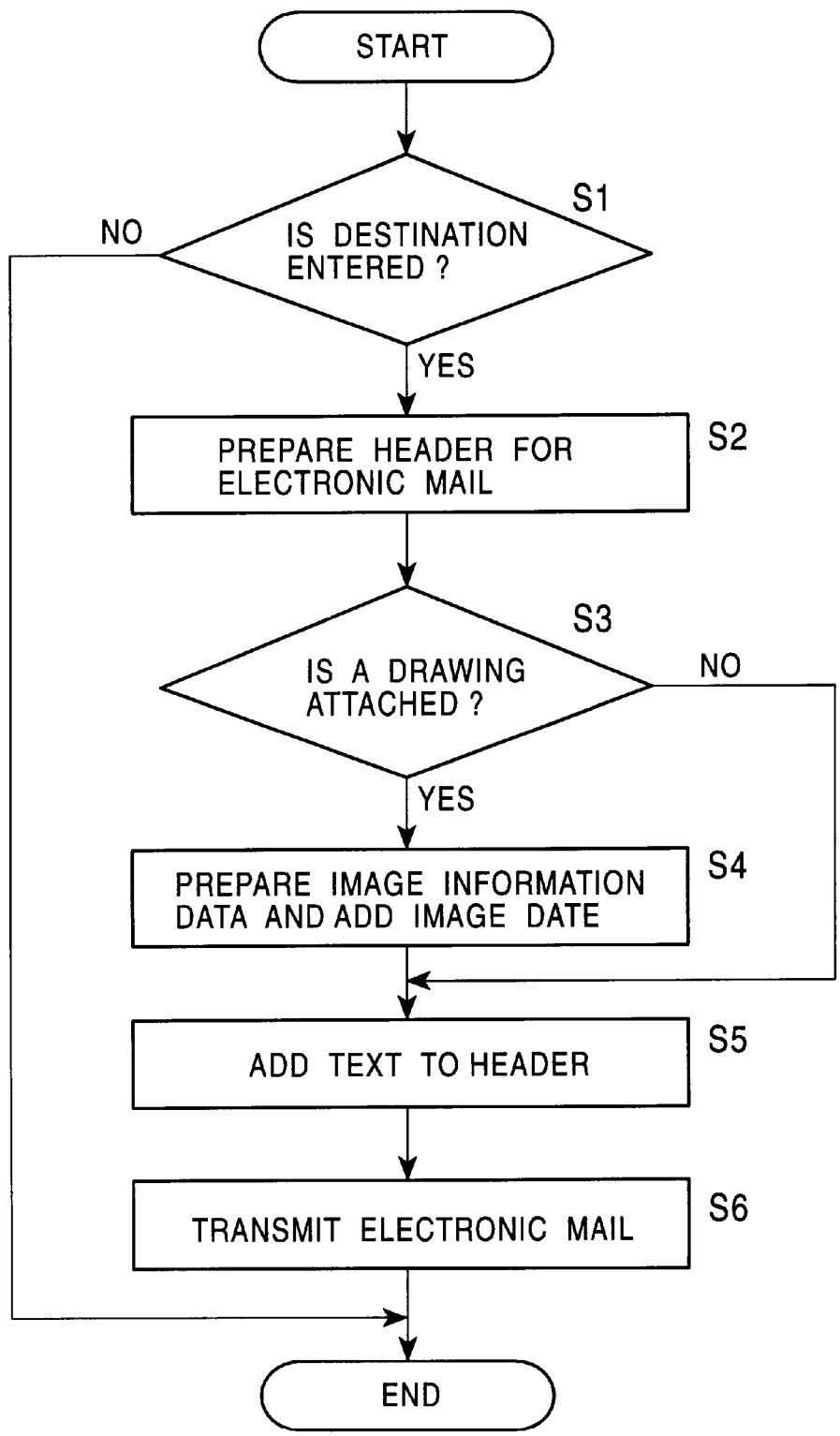
FIG. 18 is a flowchart illustrating operation of the information processing apparatus serving as a transmitting terminal of electronic mail.
Figure 19:
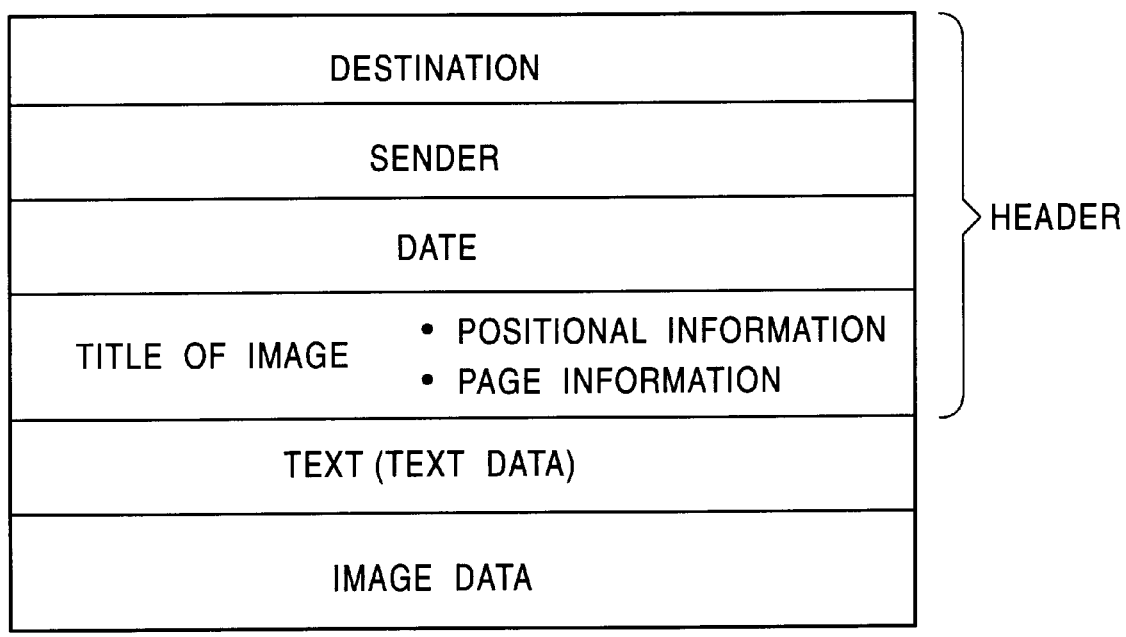
FIG. 19 illustrates a typical data format of electronic mail transmitted or received.
Figure 20:
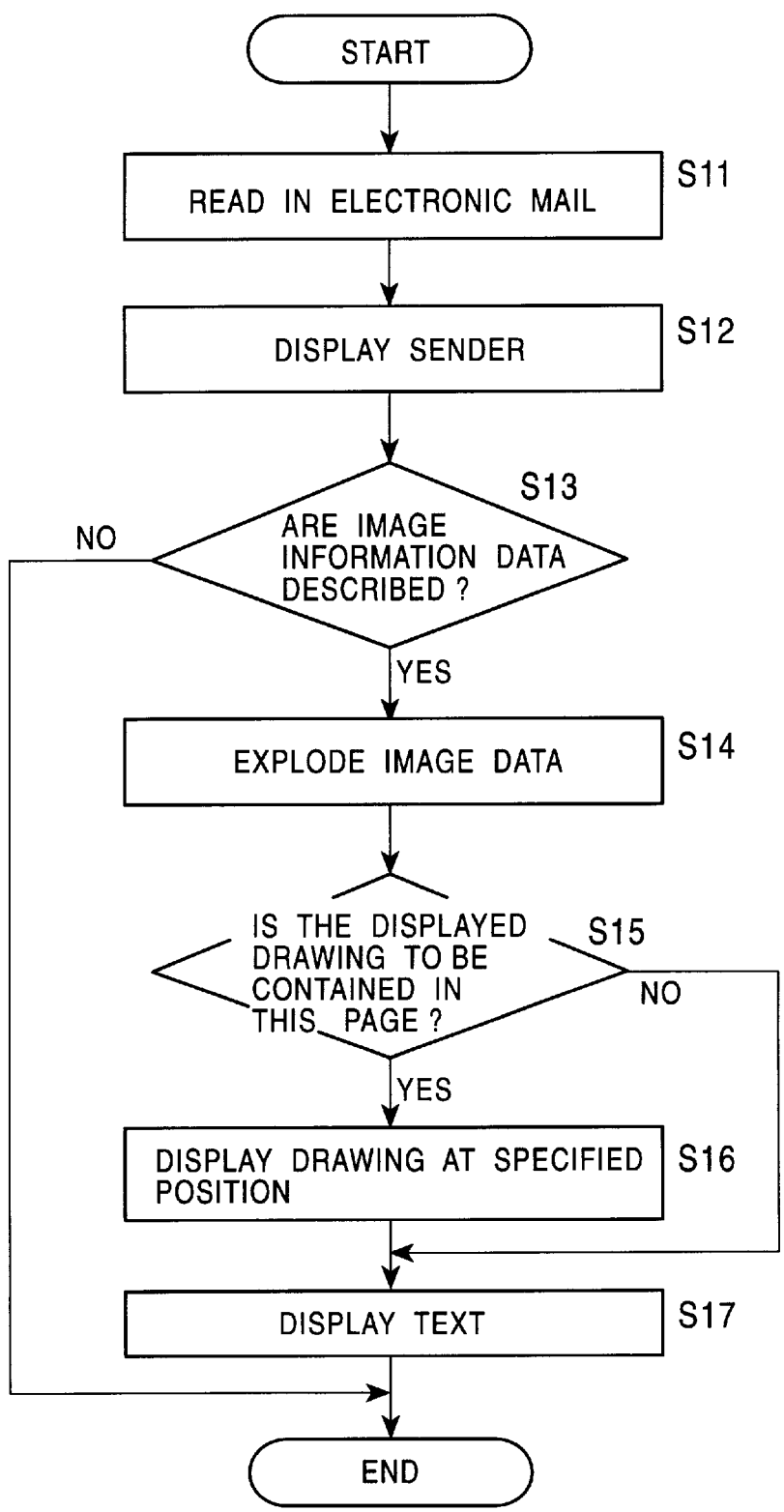
FIG. 20 is a flowchart illustrating operation of the information processing apparatus serving as a receiving terminal of electronic mail.

FIGS. 18 to 20 illustrate an electronic mail system disclosed by the present applicant in Japanese Patent Application No. H04-97,280. This electronic mail system permits easy transmission and receiving of an electronic mail containing mixed images and text. It is therefore applicable also in the present invention including an index sticker as image data. Details of this patent application will be described below in detail.

FIG. 18 is a flowchart illustrating operation of an information processing apparatus as a transmitting terminal of electronic mail. Upon issuance of a transmitting command of the electronic mail, in step S1, it is determined whether or not a destination name is entered as the receiver of the electronic mail. When it is determined that no destination is entered in step S1, the process comes to an end because the destination is unknown.

When it is determined in step S1 that a destination is entered, the process proceeds to step S2, in which an electronic mail header consisting of the destination B, a sender A and the current date in the electronic mail text is prepared, and the process goes to step S3. In step S3, it is determined whether or not image data are pasted on the electronic mail. When it is determined in step S3 that image data are pasted on the electronic mail, the process goes to step S4, in which there are prepared image information data consisting of page information showing a page bearing a pasted image, positional information showing the position of image data present on the page, and the name of the image data, and added to the electronic mail header. Positional data set by the coordinates setting section 75 described above with reference to FIG. 15 may be used as the positional information. Further, in step S4, an identifier is added after the text as text data, and the identifier is followed by image data converted into character codes by, for example, a coding program such as "Uuencode", and the process proceeds to step S5. The name of the image is automatically selected by the CPU 15 in the information processing apparatus 10 shown in FIG. 3.

When it is determined that no image data are pasted on the electronic mail in step S3, step S4 is skipped to go to step S5.

In step S5, as shown in FIG. 19, the text of the electronic mail (the text added with image data in step S4) is added to a header consisting of the destination, the sender, the current date and the image information data, and then in step S6, the electronic mail is transmitted.

FIG. 20 is a flowchart illustrating operation of the information processing apparatus serving as a receiving terminal of electronic mail. When an electronic mail incorporating command (receiving command) is issued by operating a keyboard of the input section 22 or a mouse in the information processing apparatus, in step S11, the electronic mail is read in the information processing apparatus, followed by step S12. In step S12, the sender of the header of the electronic mail is referred to: the sender A is displayed in the area for the display of the sender in the display section 20 (where the sender name is displayed on the electronic mail display screen), and the process proceeds to step S13. In step S13, it is determined whether or not the electronic mail header contains image information data. When it is determined that the electronic mail header does not contain image information, steps S14 to S16 are skipped to reach step S17.

When it is determined that the electronic mail head contains image information data in step S13, the process goes to step S14, and the image data added to the electronic mail text are exploded into binary data by the application of an encoding program such as "uudecode". In step S15, the page information of the image information data is referred to. When it is determined that the page to be displayed on the display section 20 is not a page containing an image, step S16 is skipped to go to step S17.

When the page to be displayed on the display section 20 is determined to be the page containing an image in step S15, the positional information of image information data and the name of image are referred to in step S16, the thus named image is displayed at the position indicated by the positional information. The text is displayed on the display section 20 in step S17, thus completing this process.

For the electronic mail 13 prepared through the foregoing steps in the information processing apparatus 10$a$ of the user A shown in FIG. 2, the text and the image data are image-displayed on the electronic mail display screen in the display section 20 of the other information processing apparatus 10$b$ connected on the internet.

The configuration of the means and the method of the invention is shown in FIGS. 4 to 20. It is possible to code this configuration into a software program and store the same in an external storage device such as a floppy disk or a CD-ROM. The program can be executed by the CPU 15 by loading the same onto a data-rewritable storage means such as an RAM 17 shown in FIG. 3 from that external storage device.

The means and the method for notifying transfer information according to the invention have been described with the use of the means for attaching the extracted index sticker to the electronic mail. The information used for this purpose is not limited to that available with such means. It should particularly be noted that the invention is applicable only so far as the information attached to the electronic mail has the address information showing the provider of that information. Therefore, the information added to the electronic mail is not limited to a partial area extracted from the information provided by the information providing apparatus, but may be any information, even when the provided information itself is pasted, so far as the address information having access to the information provider is attachable.

In the above description of the invention, the information provided by the WWW server via the internet is a home page. The present invention however covers pieces of information provided by various information providing apparatuses connected to any communication network unless otherwise specified. Further, the invention has been described above by using the URL as address information, but it is not limited to the URL so far as the location of the information is specified.

In this specification, the term "system" shall mean an entity as a whole composed of a plurality of apparatuses.

As a providing medium which provides a user with a computer program conducting the aforesaid process, it is possible to use a recording medium such as a magnetic disk, a CD-ROM, or a solid memory, a network or a communication medium such as a satellite.

According to the information processing apparatus, the information processing method and the providing medium of the present invention, as described above, it is possible to arrange the address information of a home page provided by an information providing apparatus and the information regarding the home page into an index sticker which can be contained in the text of the electronic mail, thus permitting easy communication of information to others.

Further, for the receiver of the electronic mail as well, it is possible to easily access the home page presenting the whole figure of the information by only selecting the index sticker, and to rapidly and accurately transfer the information to others.

Since the information provider of the WWW server can enable others to use the index sticker to permit rapid acquisition and communication of the information by causing the WWW server to previously contain information having the index sticker, the value of providing information is accordingly higher. Further, for those who do advertising agent business for various sectors of industry, addition of addresses of clients to the index sticker enables the users receiving the information to access the home pages provided by the clients, thus permitting a new form of advertising so far unavailable.

Further, comments of people intervening the transfer can be added by pasting the comment sticker to the index sticker, thus further increasing the added value of the information.

In addition, when information read out by the WWW browser, information obtained by extracting a part of the information, or information received by an electronic mail is added to a newly prepared electronic mail to transmit the same to other users, the transfer information is transmitted to the information provider in response to the transmission. As a result it is possible to easily know the status of distribution of the information by electronic mail so far difficult.

By causing such transfer information to contain various data, it is possible to know a more detailed history of information distribution. For example, by adding address information of the sender or the sender of the electronic mail to the transfer information, those who are interested in this information, and further, those who save self-information can be individually managed. Furthermore, by adding time data to the distribution information, it is possible to know the degree of interest of the information from the frequency of information transfers varying between intervals of time, thus permitting efficient and rapid provision of information thereafter.

What is claimed is:

1. An information processing apparatus capable of being connected to a communication network, comprising:
   electronic mail editing means which adds information associated with an information providing apparatus connected to said communication network and address information of the information providing apparatus to an electronic mail;
   electronic mail transmitting means which transmits said electronic mail added with said information and the address information to at least one other information processing apparatus connected via said communication network; and
   distribution information notifying means which transmits, to the information providing apparatus, transfer information showing transfer of said information in response to transmission of said electronic mail.

2. An information processing apparatus according to claim 1, wherein said transfer information contains at least a number of destinations of said electronic mail.

3. An information processing apparatus according to claim 1, wherein said transfer information contains at least address information of the information processing apparatus.

4. An information processing apparatus according to claim 1, wherein said transfer information contains at least address information of said at least one other information processing apparatus.

5. An information providing apparatus for providing information to a communication network, comprising:
   distribution information receiving means which receives, from an information processing apparatus via said communication network, transfer information showing that information provided by the information providing apparatus and address information of the information providing apparatus have been added to an electronic mail and transferred to at least one other information processing apparatus; and
   distribution information storing means for storing distribution information showing a status of transfer for each piece of said information based on the received transfer information.

6. An information providing apparatus according to claim 5, wherein:
   said transfer information contains at least a number of destinations of said electronic mail; and
   said distribution information contains data of a number of transmissions determined by adding said number of destinations for each piece of said information.

7. An information providing apparatus according to claim 5, wherein:
   said transfer information contains at least address information of the information processing apparatus; and
   said distribution information contains sender information stored for each piece of said information.

8. An information providing apparatus according to claim 5, wherein:
   said transfer information has at least address information of the at least one other information processing apparatus; and
   said distribution information contains destination data stored for each piece of said information.

9. An information providing apparatus according to claim 5, wherein:
   said distribution information storing means stores a time when said information has been transferred.

10. An information processing system comprising an information processing apparatus and an information providing apparatus, wherein:
    said information processing apparatus comprises:
       electronic mail editing means which adds information associated with an information providing apparatus connected to a communication network and address information of the information providing apparatus to an electronic mail;
       electronic mail transmitting means which transmits said electronic mail added with said information and address information to at least one other information processing apparatus connected via said communication network; and
       distribution information notifying means which transmits, to the information providing apparatus, transfer information showing that said information has been transferred in response to transmission of said electronic mail; and wherein:
    said information providing apparatus comprises:
       distribution information receiving means which receives, from said information processing apparatus, transfer information showing that said information has been transferred via said communication network; and distribution information storing means which stores distribution information showing a status of transfer for each piece of said information based on the received transfer information.

11. A method of processing information for transmitting an electronic mail, comprising:

a step of adding information associated with an information providing apparatus connected to a communication network and address information of the information providing apparatus to an electronic mail;

a step of transmitting, from an information processing apparatus, said electronic mail added with said information and the address information of the information providing apparatus to at least one other information processing apparatus connected via said communication network; and a step of transmitting, to the information providing apparatus, transfer information showing that said information has been transferred in response to transmission of said electronic mail.

12. A method of providing information from an information providing apparatus a communication network, comprising:

a step of receiving, at said information providing apparatus from an information processing apparatus via said communication network, transfer information showing that an electronic mail added with information associated with the information providing apparatus and address information of the information providing apparatus has been transferred to at least one other information processing apparatus; and a step of storing distribution information showing a status of transfer for each piece of said information based on the received transfer information.

13. A method of providing information via a communication network, comprising:

a step of adding information associated with an information providing apparatus connected to a communication network and address information of the information providing apparatus to an electronic mail;

a step of transmitting, from an information processing apparatus, said electronic mail added with said information and the address information of the information providing apparatus to at least one other information processing apparatus connected via said communication network;

a step of transmitting, to the information providing apparatus, transfer information showing that said information has been transferred in response to transmission of said electronic mail;

a step of receiving said transfer information; and a step of storing distribution information showing a status of transfer for each piece of said information based on the received transfer information.

14. A providing medium having a program readable by a computer recorded therein, which causes an information processing apparatus to execute a processing comprising:

a step of adding information associated with an information providing apparatus connected to a communication network and address information of the information providing apparatus to an electronic mail;

a step of transmitting, from the information processing apparatus, the electronic mail added with said information and the address information of the information providing apparatus to at least one other information processing apparatus connected via said communication network; and a step of transmitting, to the information providing apparatus, transfer information showing that said information has been transferred in response to transmission of said electronic mail.

15. A providing medium having a program readable by a computer recorded therein, which causes an information providing apparatus providing information via a communication network to execute a processing comprising:

a step of receiving, from an information processing apparatus via said communication network, transfer information showing that information associate with said information providing apparatus and address information of the information providing apparatus have been added to an electronic mail and transferred to at least one other information processing apparatus; and a step of storing distribution information showing a status of transfer for each piece of said information based on the received transfer information.

* * * * *